US012809840B2

(12) United States Patent
Zhang

(10) Patent No.: US 12,809,840 B2
(45) Date of Patent: Nov. 24, 2026

(54) VECTOR DATABASE BASED ON THREE-DIMENSIONAL FUSION

(71) Applicants: Southern University of Sciences and Technology, HangZhou (CN); HangZhou HaiCun Information Technology Co., Ltd., ShenZhen (CN)

(72) Inventor: Guobiao Zhang, Corvallis, OR (US)

(73) Assignees: Southern University of Sciences and Technology, ShenZhen (CN); HangZhou HaiCun Information technology Co., Ltd., HangZhou (CN)

( * ) Notice: Subject to any disclaimer, the term of this patent is extended or adjusted under 35 U.S.C. 154(b) by 0 days.

(21) Appl. No.: 19/001,398

(22) Filed: Dec. 24, 2024

(65) Prior Publication Data

US 2025/0209051 A1 Jun. 26, 2025

(30) Foreign Application Priority Data

Dec. 25, 2023 (CN) ......................... 202311815527.5
Jan. 16, 2024 (CN) ......................... 202410066648.2

(51) Int. Cl.
*G06F 16/22* (2019.01)

(52) U.S. Cl.
CPC ...... *G06F 16/2237* (2019.01); *G06F 16/2246* (2019.01)

(58) Field of Classification Search
CPC ........................... G06F 16/246; G06F 16/2237
USPC .......................................................... 707/741
See application file for complete search history.

(56) References Cited

U.S. PATENT DOCUMENTS 7,996,197 B1 * 8/2011 Xavier ............... G05B 19/4097 703/2
10,331,583 B2 * 6/2019 Ahsan ................. G06F 13/1652
11,158,369 B2 10/2021 Sharon et al.
11,947,525 B1 * 4/2024 White ................. G06F 16/2455
12,360,672 B2 7/2025 Sprouse et al.
2011/0222783 A1 * 9/2011 Matsunobu ............. G06T 3/403 382/218
2016/0033586 A1 2/2016 Hakenes
2020/0090539 A1 * 3/2020 He ........................... G09B 7/02
(Continued)

FOREIGN PATENT DOCUMENTS

CA 1282I 66 * 1/1986 ............... H04N 7/13
CN 1420444 A * 5/2003 ........... H04N 19/895
(Continued)

OTHER PUBLICATIONS

Milvus, “Binary Vector”, https://milvus.io/docs/binary-vector.md, p. 2.
(Continued)

*Primary Examiner* — Kuen S Lu
(74) *Attorney, Agent, or Firm* — Upstream Research and Patent LLC; George Guosheng Wang

(57) ABSTRACT

A vector database with 3-D fusion fuses processor into storage, i.e., it lowers the processing circuit (i.e., vector-distance calculating circuit, or VDCC) down to the lowest level of the storage circuit (i.e., storage arrays). Moreover, the VDCC and the storage arrays are 3-D integrated. By greatly reducing granularity and using massive parallelism, the present invention empowers accurate and fast brute-force search of the high-dimensional and large-scale vector database.

26 Claims, 15 Drawing Sheets

(56) References Cited

U.S. PATENT DOCUMENTS

| | | | | |
|---|---|---|---|---|
| 2025/0005072 | A1* | 1/2025 | Salowitz | G06F 16/447 |
| 2025/0022030 | A1* | 1/2025 | Partalas | G06F 16/9535 |
| 2025/0036291 | A1* | 1/2025 | Morales | G06F 3/0659 |
| 2025/0181495 | A1* | 6/2025 | Sprouse | G06F 12/0246 |

FOREIGN PATENT DOCUMENTS

| | | | | | |
|---|---|---|---|---|---|
| CN | 105319519 | A | * | 2/2016 | G01R 33/07 |
| CN | 107454345 | A | * | 12/2017 | H04N 1/642 |
| CN | 110647644 | A | * | 1/2020 | |
| CN | 117539895 | A | * | 2/2024 | G06F 16/2433 |
| CN | 113227985 | B | * | 2/2025 | G06N 3/0464 |
| JP | 2006047013 | A | * | 2/2006 | |
| KR | 20220078566 | A | * | 6/2022 | G11C 7/1006 |
| TW | I760452 | B | * | 4/2022 | G06N 3/044 |
| WO | WO-2016129390 | A1 | * | 8/2016 | H04L 9/008 |
| WO | 2021028723 | A2 | | 2/2021 | |

OTHER PUBLICATIONS

Data Magic Lab, "Binary Vectors vs. Dense Vectors vs. Sparse Vectors: A Comparative Analysis", https://datamagiclab.com/binary-vectors-vs-dense-vectors-vs-sparse-vectors-a-comparative-analysis/, Comparison Table.

* cited by examiner

VECTOR DATABASE BASED ON THREE-DIMENSIONAL FUSION

FIELD OF THE INVENTION

The present invention relates to the field of databases, and more particularly to vector databases.

PRIOR ART

A vector database is a database specifically designed to store and query high-dimensional vectors. It is commonly used in artificial intelligence (AI) applications. The proliferation of vector database is largely fueled by two trends: the first one is an explosive growth of unstructured data such as images, videos, audios, texts and others; the second one is the development of vector embeddings that can effectively transform unstructured data into feature vectors. Although it is originated from a conventional database, vector database, to work for AI, does much improvement on the conventional database and becomes an independent field.

For a conventional database (which stores scalar data types), searching is to find an exact match to a keyword. For a vector database (which stores vector data types), searching is similarity-based, which is to find vectors that are most similar to a query. Vector databases use a number of different algorithms that all participate in Approximate Nearest Neighbor (ANN) search and allow for large volumes of related information to be retrieved quickly and efficiently.

FIG. 1A illustrates a typical vector database 70. It stores a series of data vectors $V_0$, $V_1$, $V_2$ . . . $V_i$ . . . . Vectors are mathematical representations of data points in a multi-dimensional space, where each dimension corresponds to a specific feature or attribute. The dimension of data vectors in a vector database 70 ranges from tens to thousands. The input 76 of the vector database 70 includes a query vector $V_q$, while the output 77 includes a resultant vector $V_r$, which is most similar to the query vector $V_q$.

FIG. 1B illustrates a querying process. This is a simplified vector space with two dimensions (2-D) d1 and d2. Each data vector $V_i$ is represented by a point in the vector space, and the query vector $V_d$ is also represented by a point in the vector space. Their distance $D_i$ is the vector distance between the query vector $V_q$ and the data vector $V_i$. In theory, all data vectors $V_i$ in the vector database 70 need to be scanned, i.e., a vector distance $D_i$ is calculated between each data vector $V_i$ and the query vector $V_q$, then these vector distances are sorted. In the example of FIG. 1B, the data vector $V_m$ has the minimum vector distance $D_m$ from the query vector $V_q$ and therefore, $V_m$ is the nearest neighbor to $V_q$; the data vector $V_{m-1}$ has the second minimum vector distance $D_{m-1}$ from $V_q$ and therefore, $V_{m-1}$ is the second nearest neighbor to $V_d$; and so on. Overall, the data vectors with k (k>1) minimum vector distances ($V_m$, $V_{m-1}$ . . . ) are the k nearest neighbors to the query vector $V_q$, which are often referred to as top-k nearest neighbors (KNN). The above scanning process is referred to as brute-force search.

It is impractical to conduct brute-force search for a conventional hardware (more particularly for the von Neumann architecture). Although it is not difficult to satisfy the storage needs for a vector database, the prior-art storage is dumb, i.e., without any search capability. Because the processor is separated from storage in the conventional hardware and each processor needs to process data from at least a storage die, a brute-force search takes hours, too long to be acceptable.

To speed up search, prior art generally uses software approaches, more particularly indexing. Common indexing methods include quantization-based indexing, graph-based indexing and tree-based indexing. FIG. 1C illustrates a quantization-based indexing. It applies a quantizer Z to map vectors $V_1$-$V_{10}$ to three buckets 10 to 30 with centroids being $c_1$ to $c_3$, thus $Z(V_1)$, $Z(V_2)$, $Z(V_3)$, $Z(V_4)=c_1$; $Z(V_5)$, $Z(V_6)$, $Z(V_7)=c_2$; and, $Z(V_8)$, $Z(V_9)$, $Z(V_{10})=c_3$. During the querying process, the query vector $V_q$ is first mapped to a bucket 20 by the quantizer Z, i.e., $Z(V_q)=c_2$, then its nearest neighbor is searched within this bucket 20 and found to be $V_7$. By limiting searches to a single bucket, the quantization-based indexing can speed up the querying process.

Indexing suffers low accuracy. As shown in FIG. 1C, for the query vector $V_q'$, because it is quantized to the bucket 20, i.e., $Z(V_d')=c_2$, its nearest neighbor is determined to be $V_5$. In fact, as $V_q'$ is closer to $V_2$ of the bucket 10, its nearest neighbor should be $V_2$. This type of error is unavoidable when the query vector is near a boundary of a bucket. It becomes even pronounced for high-dimensional vector (>1, 000 dimensions). Another issue suffered by indexing is that it requires pre-computing, i.e., computing the index file of the whole vector database before querying. For a large-scale vector database (e.g., containing $>10^9$ vectors), indexing is computing intensive and time consuming. Furthermore, indexing is not suitable for dynamic data or dynamic metrics. Once an index has been computed, if there is any change in the vector data or the distance metrics (i.e., vector-distance calculating algorithms), the whole index needs to be re-computed. Finally, the index file needs to be loaded to the main memory during querying. This requires a large main memory and results in a high system cost.

Although it works well for conventional database (which stores scalar data types), indexing does not work well for the vector database (which stores vector data types). Indexing-based vector databases are typically limited to small-dimension (thousands) and small-scale (billions, $10^9$ vectors). This might be adequate for small knowledge bases, but far from enough for a general knowledge base which stores the whole human knowledge (i.e., world knowledge base). The world knowledge base contains trillions ($10^{12}$) to quadrillion ($10^{15}$) vectors. For the vector database of this scale, software approach is not enough, and new hardware needs to be developed.

OBJECT OF THE INVENTION

It is a principle object of the present invention to realize generative AI and large-language model (LLM) using storage power instead of computational power ("storage power" requires not only a large storage capability, but also an accurate and fast searching capability).

It is a further object of the present invention to provide a high-dimensional and large-scale vector database with high data-retrieval accuracy, fast performance and low system cost.

It is a further object of the present invention to provide a vector database supporting dynamic data.

It is a further object of the present invention to provide a vector database supporting dynamic metrics (i.e., vector-distance calculating algorithms).

In accordance with these and other objects of the present invention, the present invention discloses a vector databases based on three-dimensional (3-D) fusion.

SUMMARY OF THE INVENTION

To overcome the limitations faced by the software approach (e.g., indexing), the present invention discloses an improved vector database. Unlike the conventional hardware whose processor is separated from storage, the present invention uses fusion, i.e., fuses processors into storage. To be more specific, the present invention lowers the processing circuit (i.e., vector-distance calculating circuit, or VDCC) down to the lowest level of the storage circuit (i.e., storage arrays). Because the storage array is the smallest building block of the storage circuit, the present invention has the smallest granularity (i.e., the amount of data processed by each VDCC), which is array-scale (~Mb). This is much smaller than prior art, whose granularity is die-scale (~Tb). By greatly reducing granularity and using massive parallelism, the present invention empowers accurate and fast brute-force search for the high-dimensional and large-scale vector database.

The preferred vector database is stored in a storage-processing body (SPB). The SPB comprises multiple storage-processing cores (SPC's), with each SPC comprising a plurality of storage-processing units (SPU's) and a minimum-distance search circuit (MDSC). Here, the SPC is the basic building block of the SPB (in the physical world), while the SPU is the basic building block of the SPC (from a design perspective). Each SPU comprises at least a storage array and a vector-distance calculating circuit (VDCC). The MDSC searches the minimum vector distance $D_m$ from the vector distances $D_i$ calculated by all VDCC's. As a brute-force search, all vectors in the vector database are scanned (read out from storage arrays) and their vector distances from the query vector $V_q$ (calculated by VDCC) are compared with each other, then the nearest neighbor $V_m$ of $V_d$ is found by searching the minimum vector distance $D_m$ (performed by MDSC).

Accordingly, the present invention discloses a fused vector database, comprising an input for inputting a query vector and at least a storage-processing core (SPC) coupled with said input, wherein said SPC comprises: a plurality of storage-processing units (SPU's), each of said plurality of SPU's comprising at least a storage array for storing at least a data vector in said vector database, and a vector-distance calculation circuit (VDCC) for calculating a vector distance between said query vector and said data vector; and, a minimum-distance search circuit (MDSC) for searching at least a minimum vector distance from the vector distances calculated by the VDCC's in said plurality of SPU's.

Because brute-force search does not use any approximation methods (e.g., indexing), the present invention achieves good accuracy—the nearest neighbor found by the MDSC is the true nearest neighbor. This solves the problem of low accuracy for the high-dimensional vector database in prior art. Furthermore, because search is performed in parallel at all SPU's, the total search time is roughly independent of the scale Z of the vector database. No matter whether Z is trillion ($10^{12}$), quadrillion ($10^{15}$), or even higher, the search time is about the same (e.g., ~10 ms). This is far more superior to prior art. Moreover, the present invention supports dynamic data (i.e. data vector in the vector database can be changed, added and/or deleted) and dynamic metrics (i.e., VDCC uses different vector-distance calculating algorithms in different scenarios).

The present invention further supports top-k (k>1) nearest neighbors. The MDSC is suitable to find the minimum vector distance $D_m$ to a query vector $V_q$. To take full advantage of the MDSC, a reset circuit is used to reset the register storing $D_m$ to a pre-determined value (typically a maximum value, e.g., every bit is reset to "1") after $D_m$ is found. This effectively takes $D_m$ out of consideration for the next round of minimum-distance search. Thus, the minimum vector distance found at the next round is in fact the second minimum vector distance $D_{m-1}$. This process can be repeated to find all top-k nearest neighbors.

Conventionally, fusion (i.e., fusing processors into storage) is realized through two-dimensional (2-D) integration, i.e., the storage circuit and the logic circuit are integrated side-by-side on a same substrate. This leads to two problems: the first problem is a larger die size (storage arrays become less dense) and a higher cost; the second problem is that, because the manufacturing processes for the storage circuit and the logic circuit are not compatible, integrating them on the same substrate leads to a complex manufacturing process and an even higher cost. To solve these problems, the present invention realizes fusion through three-dimensional (3-D) integration. In a preferred SPU based on 3-D integration (i.e., 3-D SPU), the storage circuit and the logic circuit are disposed on two physical planes: storage array are disposed on a first plane, while VDCC and MDSC are disposed on a second plane. The first and second planes are vertically stacked and communicatively coupled by inter-plane connections. One role of these inter-plane connections is to provide large-bandwidth electrical connections between two planes. Another role is to provide large-strength mechanical connections between two planes.

Accordingly, the present invention discloses a three-dimensional (3-D) vector database, comprising an input for inputting a query vector and at least a storage-processing core (SPC) coupled with said input, wherein said SPC comprises: a plurality of storage-processing units (SPU's), each of said plurality of SPU's comprising at least a storage array for storing at least a data vector in said vector database, and a vector-distance calculation circuit (VDCC) for calculating a vector distance between said query vector and said data vector; at least a semiconductor substrate, wherein said VDCC is disposed on said semiconductor substrate; said storage array is disposed above said VDCC; said VDCC and the projection of said storage array on said semiconductor substrate at least partially overlap; said VDCC and said storage array are communicatively coupled.

The SPC based on 3-D integration (i.e., 3-D SPC) takes two forms: one is a storage-processing die, while the other is a storage-processing stack (which comprises bonded dice). The preferred storage-processing die is a single die and uses monolithic 3-D integration, i.e., its storage circuit (including 3-D memory arrays) is vertically stacked above the logic circuit (including VDCC, MDSC, and the peripheral circuits of the 3D-M arrays), both in the same die. On the other hand, the preferred storage-processing stack comprises several bonded dice, e.g., a storage die (comprising storage arrays disposed on a first substrate) and a logic die (comprising VDCC, MDSC and even portions of the peripheral circuits of the storage arrays, all disposed on a second substrate). They are vertically stacked and bonded. In the preferred storage-processing stack, the storage could be conventional 2-D memory (such as RAM, ROM, or NVM) or 3-D memory (3D-M). One storage-processing stack of importance is a storage-processing doublet, which comprises two (a pair of) face-to-face dice bonded by hybrid bonding.

Like flash memory and solid-state drives, the preferred SPC's can be packaged into storage-processing cards; the storage-processing cards can be packaged into storage-processing drives; and, the storage-processing drives can be packaged into storage-processing clusters. They form a storage-processing hierarchy. Each level of the storage-processing hierarchy could have its own vector-computing circuit, e.g., VDCC, filtering circuit, and sorting circuit. The vector-computing circuit at a lower level is generally less complex than the one at a higher level. Moreover, the selection criterion at a lower level is more lenient.

Figure 1A:
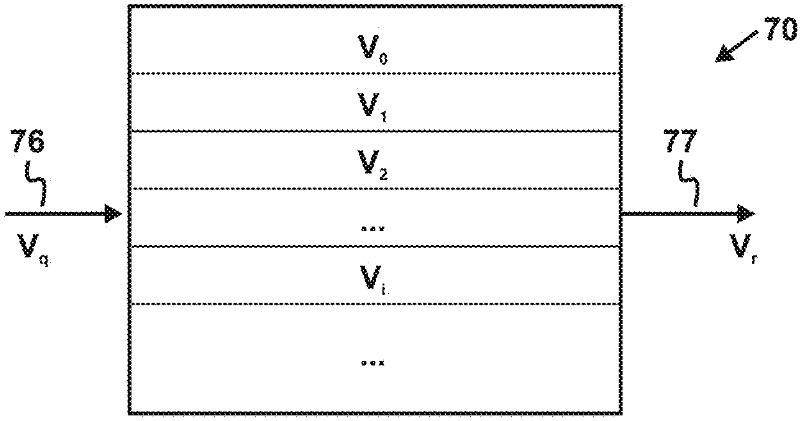
FIG. 1A is a diagram showing a vector database.
Figure 1B:
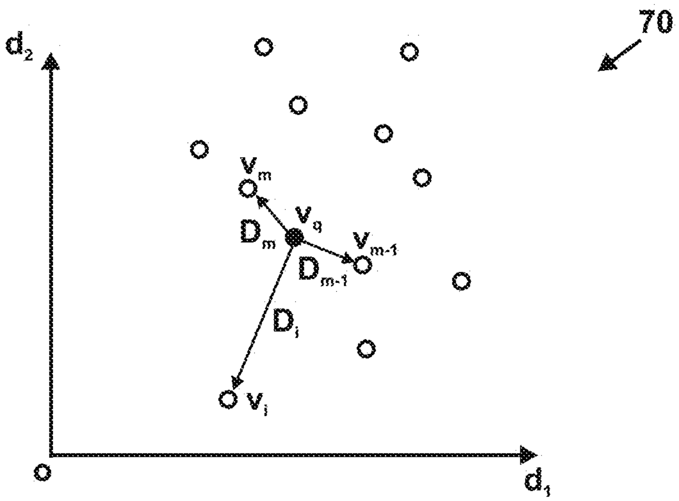
FIG. 1B is a diagram showing a simplified vector space with two dimensions.
Figure 1C:
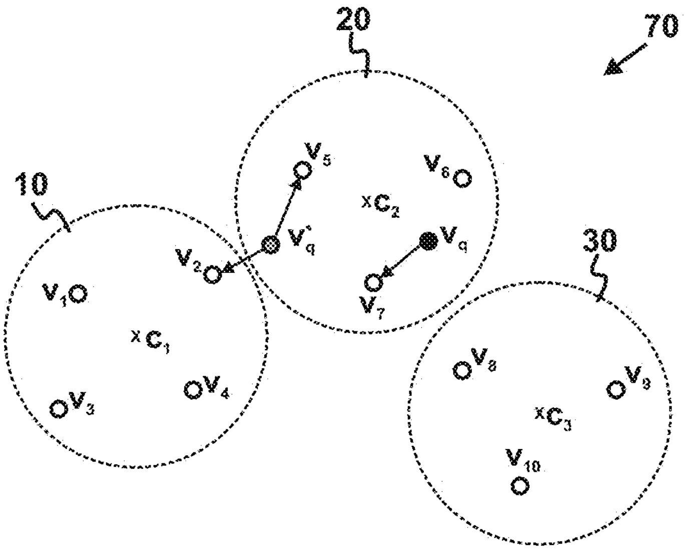
Fig. 1C (prior art)
FIG. 1C is a diagram showing an indexing algorithm (prior art).

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments. References to numbers without subscripts or suffixes are understood to reference all instance of subscripts and suffixes corresponding to the referenced number. The symbol "/" means the relationship of "and" or "or".

DETAILED DESCRIPTION OF THE INVENTION

As used herein, the phrase "vector database" could refer to either vector database in the mathematical sense (i.e., an organized collection of vectors), or the hardware/software used to implement a vector database (hardware includes processor, storage and associated architecture; and, software includes the index file and the associated indexing algorithms). The present invention does not differentiate them.

As used herein, the phrases "storage" and "memory" are used interchangeably and in their broadest sense to mean any semiconductor device which can store information. Embodiments may include random-access memory (RAM), read-only memory (ROM), non-volatile memory (NVM) and three-dimensional memory (3D-M). The phrases "storage array" and "memory array" are also used interchangeably. Storage/memory array is the basic building block of a storage/memory die. It means a collection of all memory cells sharing at least one address line. The phrase "storage-processing body" is used in its broadest sense to mean any storage with built-in processing capability. Examples include storage-processing core (SPC), storage-processing card, storage-processing drive, and storage-processing cluster.

As used herein, the phrase "core" is used in its broadest sense to mean a mechanically-stable entity, i.e., in a direction perpendicular to its substrate, its mechanical strength is too strong to be pried open by external mechanical forces (before breaking the substrate). Storage-processing core (SPC) is the basic building block of the storage-processing body in the physical world. SPC takes two forms: one is a single die, the other is a stack (containing several bonded dice, e.g., a doublet).

As used herein, the phrase "on a substrate" means that the active elements (e.g., transistors, memory cells) or portions thereof are located in the substrate, even though the interconnects coupling them are located above the substrate. The phrase "above a substrate" means that the active elements (e.g., transistors, memory cells) are located above the substrate, not in the substrate. Unless being pointed out specifically, the phrases "up (on, above)" "down (below, beneath)" means relative positions when the die is placed upward, i.e., the substrate is at the bottom. Even when a die is flipped, these phrases are still used in the same sense as those before the die is flipped.

As used herein, the phrase "plane" means a plane in an abstract sense. It may comprise physical structures with a finite thickness. For example, a plane may comprise a memory array with multiple memory levels, or a circuit with multiple interconnect levels. The phrase "a first plane is stacked on a second plane" means first physical structures (e.g., storage arrays) with a first finite thickness are stacked on second physical structures (e.g., substrate circuits) with a second finite thickness.

To overcome the limitations faced by the software approach (e.g., indexing), the present invention discloses an improved vector database. Unlike the conventional hardware whose processor is separated from storage, the present invention uses fusion, i.e., fuses processors into storage. To be more specific, the present invention lowers the processing circuit (i.e., vector-distance calculating circuit, or VDCC) down to the lowest level of the storage circuit (i.e., storage arrays). Because the storage array is the smallest building block of the storage circuit, the present invention has the smallest granularity (i.e., the amount of data processed by each VDCC), which is array-scale (~Mb). This is much smaller than prior art, whose granularity is die-scale (~Tb). By greatly reducing granularity and using massive parallelism, the present invention empowers accurate and fast brute-force search for the high-dimensional and large-scale vector database.

Figure 2A:
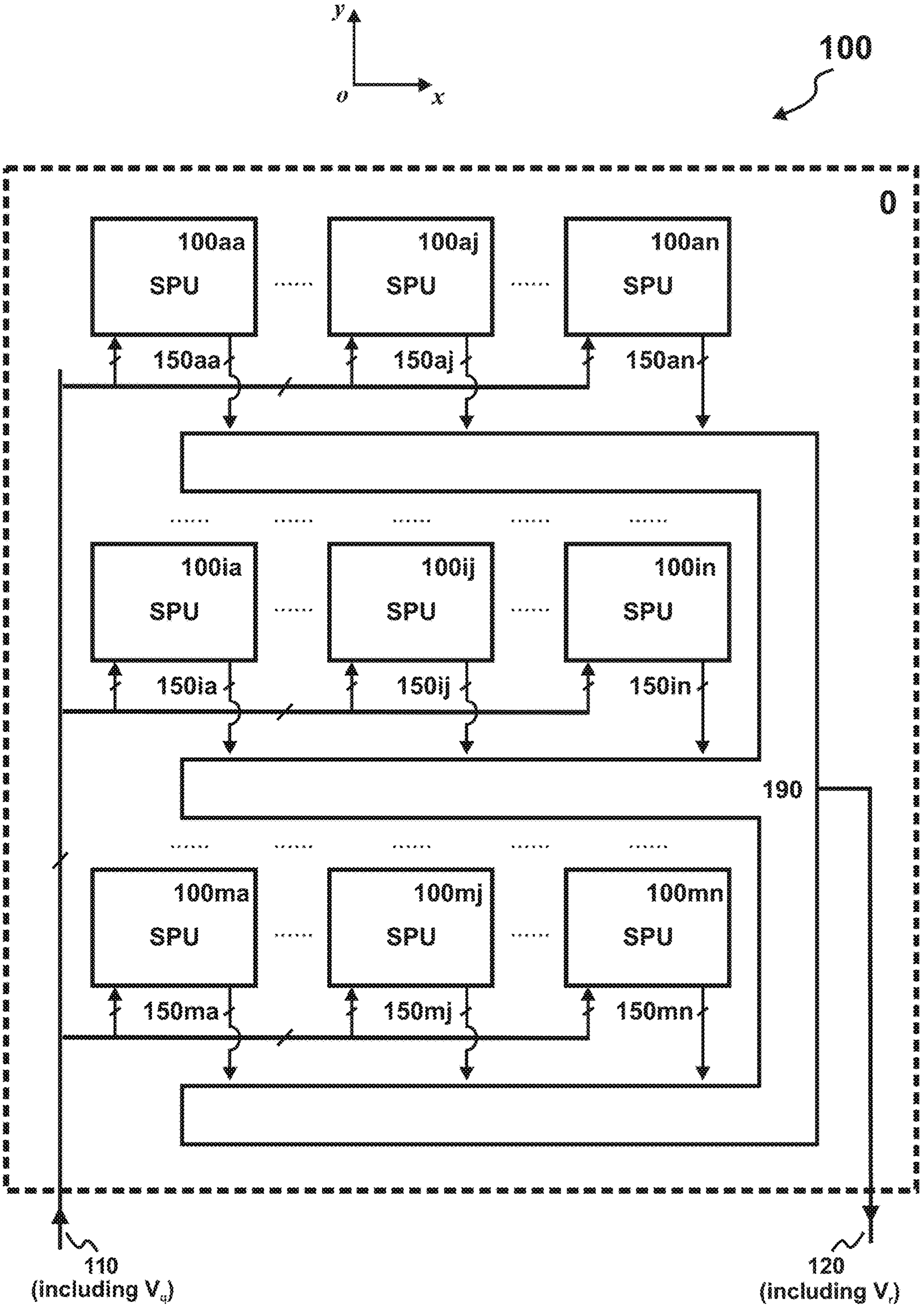
FIG. 2A is a block diagram of a preferred storage-processing core (SPC) in a preferred fused vector database.
Figure 2B:
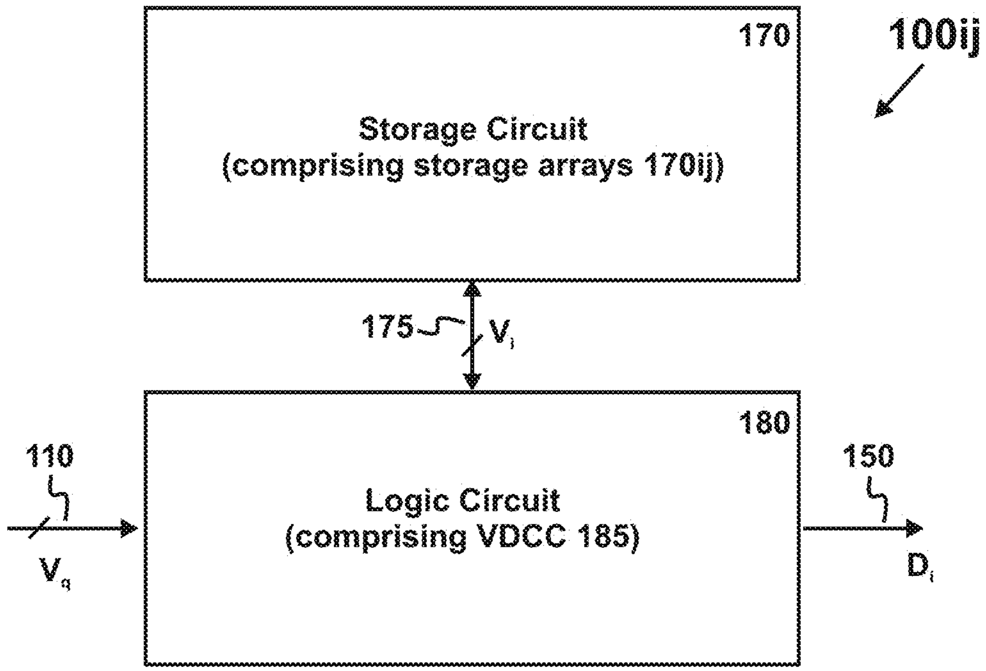
FIG. 2B is a block diagram of a preferred storage-processing unit (SPU) in the preferred SPC.

Referring now to FIGS. 2A-2B, a preferred storage-processing core (SPC) 100 in the preferred vector database is disclosed. The preferred vector database is stored in a preferred storage-processing body, which comprises multiple SPC's 100. The preferred SPC 100 (FIG. 2A) is the basic building block of the storage-processing body (in the physical world). It is a mechanically-stable entity. The SPC 100 not only can store data (vector database), but also can process data (calculate vector distance). The data are stored locally and in close proximity to the processing circuit. The inputs 110 of the SPC 100 include the query vector $V_q$, and outputs 120 include the result vector $V_r$. The SPC 100 is disposed on a semiconductor substrate 0. It comprises m×n storage-processing units (SPU's 100*aa* . . . 100*ij* . . . 100*mn*) and a minimum-distance search circuit (MDSC) 190.

The SPU 100*ij* is the basic building block of the SPC 100 (from a design perspective). Each SPU 100*ij* comprises a storage circuit 170 and a logic circuit 180 (FIG. 2B). The storage circuit 170 comprises storage arrays 170*ij*, which stores at least a data vector $V_i$ 175 from the vector database. The logic circuit 180 comprises a vector-distance calculation circuit (VDCC) 185. The inputs 110, 175 of the VDCC 185 include the query vector $V_q$ and the data vector $V_i$, while the output 150 (150*aa* . . . 150*mn* in FIG. 2A) includes the vector distance $D_i$. The MDSC 190 compares the vector distances $D_i$ from all SPU's (100*aa* . . . 100*mn*) and searches for a minimum vector distance $D_m$ and the associated data vector $V_m$, which is the resultant vector $V_r$.

Because brute-force search does not use any approximation methods (e.g., indexing), the present invention achieves good accuracy—the nearest neighbor found by the MDSC is the true nearest neighbor. This solves the problem of low accuracy for the high-dimensional vector database in prior art. Furthermore, because search is performed in parallel at all SPU's, the total search time is roughly independent of the scale Z of the vector database. No matter whether Z is trillion ($10^{12}$), quadrillion ($10^{15}$), or even higher, the search time is about the same (e.g., ~10 ms). This is far more superior to prior art.

Conventionally, fusion (i.e., fusing processors into storage) is realized through two-dimensional (2-D) integration, i.e., the storage circuit and the logic circuit are integrated side-by-side on a same substrate. This leads to two problems: the first problem is a larger die size (storage arrays become less dense) and a higher cost; the second problem is that, because the manufacturing processes for the storage circuit and the logic circuit are not compatible, integrating them on the same substrate leads to a complex manufacturing process and an even higher cost. To solve these problems, the present invention realizes fusion through three-dimensional (3-D) integration.

Figure 3:
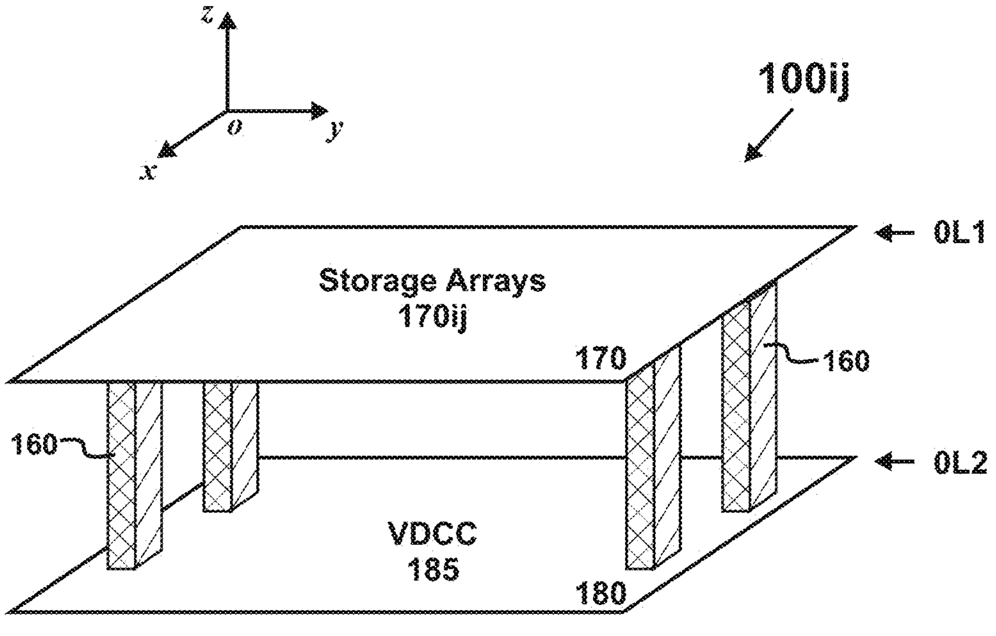
FIG. 3 is perspective view of a preferred three-dimensional (3-D) SPU.

In FIG. 3, a preferred SPU 100*ij* based on 3-D integration (i.e., 3-D SPU) is disclosed. Its storage circuit 170 (including storage arrays 170*ij*) is disposed on a first plane 0L1, while the logic circuit 180 (including VDCC 185) is disposed on a second plane 0L2. The first and second planes are vertically stacked and communicatively coupled by inter-plane connections 160. One role of these inter-plane connections 160 is to provide large-bandwidth connections between two planes 0L1, 0L2. Another role is to provide mechanically-stable connections between two planes 0L1, 0L2.

Figure 4A:
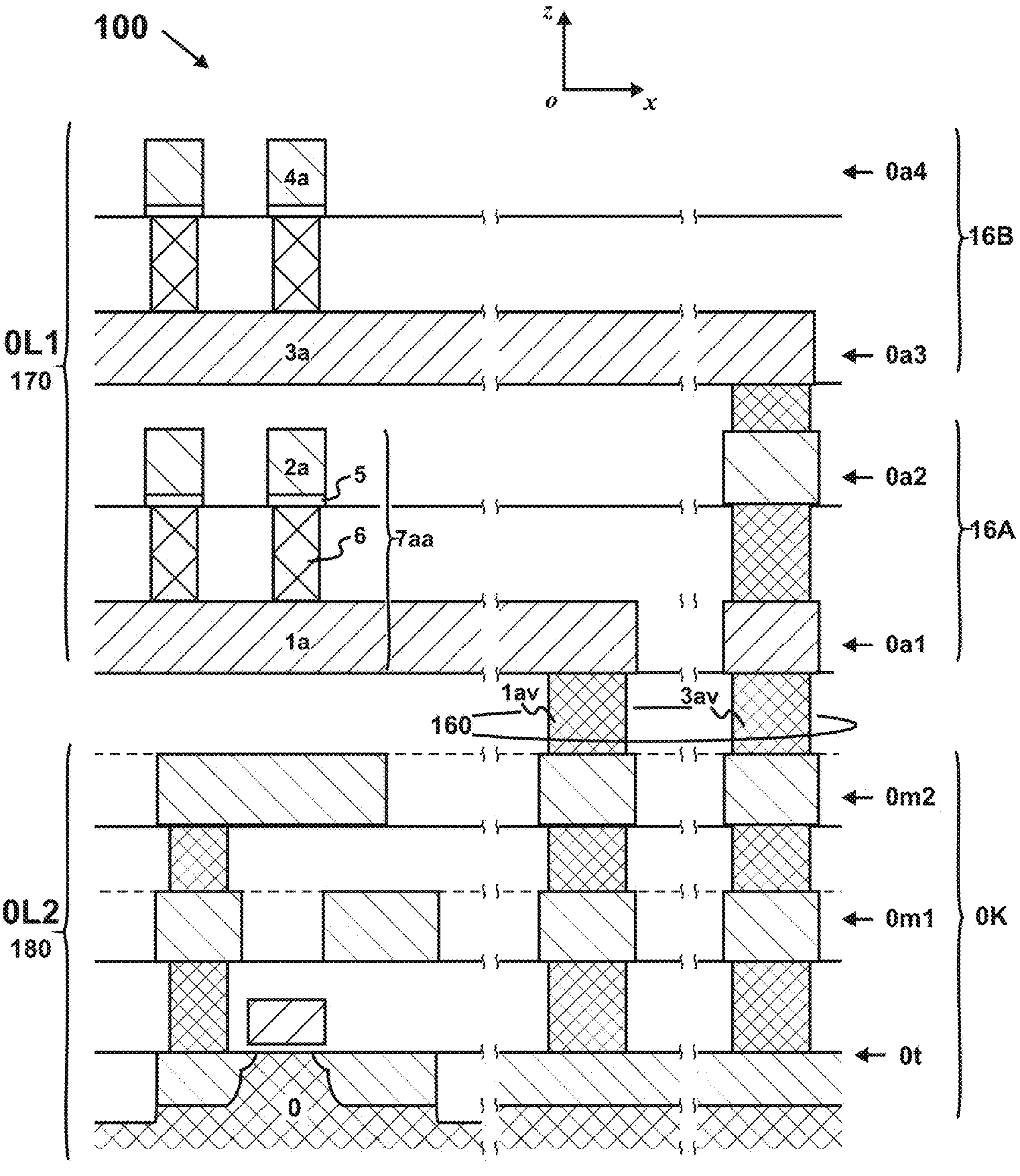
FIGS. 4A-4B are cross-sectional views of two preferred storage-processing dice.
Figure 4B:
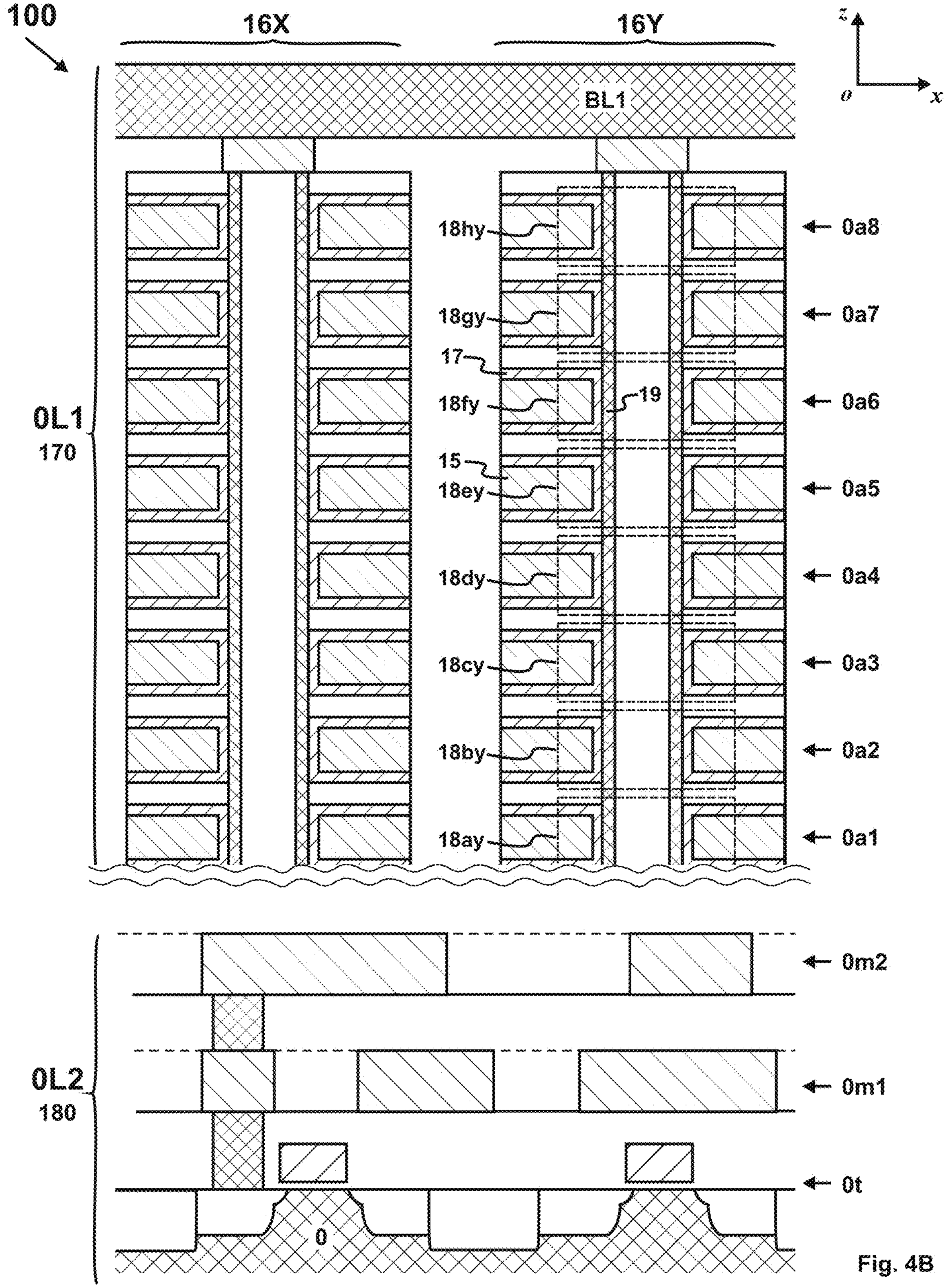
Figure 5A:
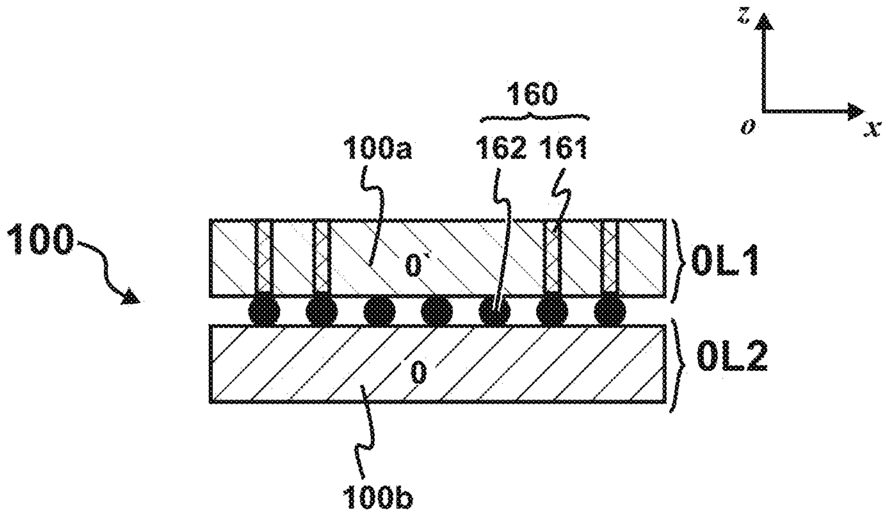
FIGS. 5A-5B are cross-sectional views of two preferred storage-processing stacks.
Figure 5B:
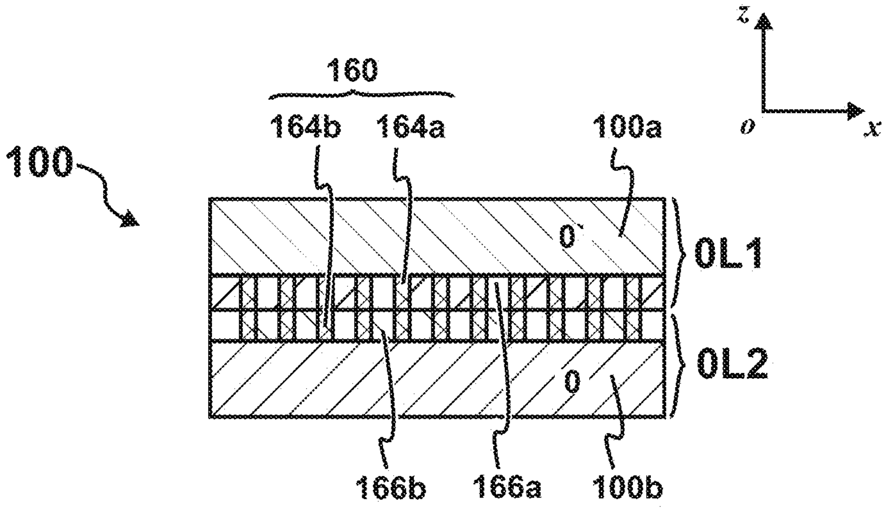

The SPC based on 3-D integration (i.e., 3-D SPC) 100 takes two forms: one is a storage-processing die (FIGS. 4A-4B), while the other is a storage-processing stack (FIGS. 5A-5B). The preferred storage-processing die is a single die and uses monolithic 3-D integration, i.e., its storage circuit 170 (including 3-D memory arrays 100*ij*) is vertically stacked above the logic circuit 180 (including VDCC 185, MDSC 190, and the peripheral circuits of the 3D-M arrays), both in the same die. On the other hand, the preferred storage-processing stack comprises several bonded dice, e.g., a storage die 100*a* (comprising storage arrays disposed on a first substrate 0') and a logic die 100*b* (comprising VDCC 185, MDSC 190 and even portions of the peripheral circuits of the storage arrays, all disposed on a second substrate 0) are vertically stacked and bonded. In the preferred storage-processing stack, the storage could be conventional 2-D memory (such as RAM, ROM, or NVM) or 3-D memory (3D-M). For example, the storage circuit 170 could be DRAM, then the present invention is a main memory with built-in MDSC; the storage circuit 170 could be flash, then the present invention is an external memory with built-in MDSC; the storage circuit 170 could be 3D-XPoint, then the present invention is a persistent memory with built-in MDSC.

Referring now to FIGS. 4A-4B, two preferred storage-processing dice 100 are shown. In the preferred storage-processing die 100, because the storage circuit 170 is stacked on the logic circuit 180, the fusion between the storage circuit 170 and the logic circuit 180 would not increase the die size. This is quite an improvement over the conventional 2-D integration. The preferred storage-processing die 100 comprises 3-D memory (3D-M) arrays 170*ij*. Unlike a conventional memory whose memory cells are disposed on a 2-D plane, the memory cells in a 3D-M array 170*ij* are disposed in a 3-D space. These 3D-M arrays 170*ij* are monolithically integrated on a substrate circuit OK, which is disposed on a semiconductor substrate 0. Note that the logic circuit 180 (including VDCC 185, MDSC 190 and the peripheral circuits of the 3D-M arrays 170*ij*) are portions of the substrate circuit OK.

Based on its physical structure, 3D-M can be categorized into horizontal 3D-M (3D-MH) and vertical 3D-M (3D-Mv). In a 3D-MH, all address lines are horizontal. The memory cells form a plurality of horizontal memory levels which are vertically stacked above each other. A well-known 3D-MH is 3D-XPoint. In a 3D-Mv, at least one set of the address lines are vertical. The memory cells along these vertical address lines form a plurality of vertical memory strings which are placed side-by-side on/above the substrate. A well-known 3D-Mv is 3D-NAND. In general, the 3D-MH (e.g., 3D-XPoint) is faster, while the 3D-Mv (e.g., 3D-NAND) is denser.

Based on its functionality, 3D-M can be categorized into 3D-RAM (random-access memory) and 3D-ROM (read-only memory). The 3D-RAM can be used as cache. The 3D-ROM can store data for long term. It is also referred to as 3-D non-volatile memory (NVM). Exemplary memory types that are suitable for the 3D-M include memristor, resistive RAM (RRAM or ReRAM), phase-change memory (PCM), programmable metallization cell (PMC) memory, conductive-bridging random-access memory (CBRAM), and the like.

In FIG. 4A, the storage-processing die 100 comprises a logic circuit 180 and a storage circuit 170. The logic circuit 180 (including VDCC 185), whose physical location is at the second plane 0L2, is a portion of a substrate circuit OK (including transistors 0*t* and substrate interconnects 0*m*1, 0*m*2). The storage circuit 170, whose physical location is at the first plane 0L1, includes 3D-MH array(s). In this example, the storage circuit 170 comprises four address-line layers 0*a*1-0*a*4. Each address-line layer (e.g. 0*a*1) comprises a plurality of address lines (e.g. 1*a*). These address-line layers 0*a*1-0*a*4 form two memory levels 16A, 16B, with the memory level 16A stacked on the substrate circuit OK and the memory level 16B stacked on the memory level 16A. Memory cells (e.g., 7*aa*) are disposed at the intersections between two address lines (e.g., 1*a*, 2*a*). The memory levels 16A, 16B are communicatively coupled with the substrate circuit OK through contact vias 1*av*, 3*av*, which form inter-plane connections 160. Note that contact vias 1*av*, 3*av* are intra-die connections.

In the storage circuit 170 of FIG. 4A, the memory cell 7*aa* comprises a programmable layer 5 and a diode layer 6. The programmable layer 5 could be an antifuse layer (which can be programmed once and used for the 3D-OTP) or a resistive RAM (RRAM) layer (which can be re-programmed and used for the 3D-MTP). The diode layer 6 is broadly interpreted as any layer whose resistance at the read voltage is substantially lower than when the applied voltage has a magnitude smaller than or a polarity opposite to that of the read voltage. To those skilled in the art, diode is also referred to as selector, steering element, one-way switch, and the like.

FIG. 4B is similar to FIG. 4A, except that the 3D-M array is a 3D-My array. The storage circuit 170 comprises eight vertically stacked horizontal address-line layers 0*a*1-0*a*8. Each horizontal address-line layer (e.g. 0*a*5) comprises a plurality of horizontal address lines (e.g. 15). The storage circuit 170 also comprises a set of vertical address lines 19, which are perpendicular to the surface of the substrate 0. For reason of simplicity, the inter-plane connections 160 between the 3D-My arrays 170 and the substrate circuit OK are not shown. They are well known to those skilled in the art.

The preferred 3D-My array in FIG. 4B is based on vertical transistors or transistor-like devices. It comprises a plurality of vertical memory strings 16X, 16Y placed side-by-side. Each memory string (e.g. 16Y) comprises a plurality of vertically stacked memory cells (e.g. 18*ay*-18*hy*). Each memory cell (e.g. 18*fy*) comprises a vertical transistor, which includes a gate (acts as a horizontal address line) 15, a storage layer 17, and a vertical channel (acts as a vertical address line) 19. The storage layer 17 could comprise oxide-nitride-oxide layers, oxide-poly silicon-oxide layers, or the like. Alternatively, the preferred 3D-My array may be based on diodes or diode-like devices.

Referring now to FIGS. 5A-5B, two preferred storage-processing stacks 100 are shown. The preferred stack 100 comprises a first die 100*a* (including the storage circuit 170) and a second die 100*b* (including the logic circuit 180), which are stacked and bonded. Through vertical stacking, the fusion of the storage circuit 170 and the logic circuit 180 would not increase the die size. More importantly, because the storage circuit 170 and the logic circuit 180 are respectively disposed on the storage die 100*a* and the logic die 100*b*, they can be made by different manufacturing processes, thus simplifying the process design and further lowering the cost.

The preferred storage-processing stack of FIG. 5A uses face-to-back bonding, i.e. the face of the second die 100*b* is bonded to the back of the first die 100*a*. During manufacturing process, through-silicon vias (TSV's) 161 are etched through the first die 100*a*. Both first and second dice 100*a*, 100*b* face upward (+z direction) at bonding. The first die 100*a* is communicatively coupled with the second die 100*b* through the micro-bumps 162. The TSV's 161 and the micro-bumps 162 realize the inter-die (plane) connections 160.

The preferred storage-processing stack of FIG. 5B uses face-to-face bonding, i.e., the first and second dice 100*a*, 100*b* are bonded face-to-face. To be more specific, the first die 100*a* is flipped and faces downward (i.e. along the −z direction), while the second die 100*b* faces upward (i.e. along the +z direction). This face-to-face bonded stack (pair) is also referred to as doublet. The preferred doublet 100 uses hybrid-bonding technology and two dice 100*a*, 100*b* are bonded by metal-to-metal (e.g., Cu—Cu) bonding. During manufacturing process, a first dielectric layer 166*a* is deposited on top of the first die 100*a* and first vias 164*a* are etched in the first dielectric layer 166*a*. Then a second dielectric layer 166*b* is deposited on top of the second die 100*b* and second vias 164*b* are etched in the second dielectric layer 166*b*. After flipping the first die 100*a* and aligning the first and second vias 164*a*, 164*b*, the first and second dice 100*a*, 100*b* are bonded. The contacted first and second vias 164*a*, 164*b* realize the inter-die (plane) connections 160. Because there is no semiconductor substrate between them, the first and second dice 100*a*, 100*b* are in close proximity and therefore, the first and second vias 164*a*, 164*b* can be made small and numerous. As a result, the inter-die (plane) connections 160 have a large bandwidth. It should be well known to those skilled in the art that, besides metal-to-metal bonding, dielectric-to-dielectric bonding or dielectric-to-semiconductor bonding may also be used.

Both preferred embodiments in FIGS. 5A-5B may use wafer-scaling bonding, i.e., two wafers are first bonded before being diced. Accordingly, the first and second dice 100*a*, 100*b* could have the same die sizes, and all edges of the first and second dice 100*a*, 100*b* are aligned. For example, the left edge of the first die 100*a* is aligned with the left edge of the second die 100*b*; and, the right edge of the first die 100*a* is aligned with the right edge of the second die 100*b*.

Referring now to FIGS. 6A-7C, three preferred 3-D SPU 100*ij* are shown. In these preferred embodiments, a VDCC 185 serves different number of storage arrays 170*ij*.

Figure 6A:
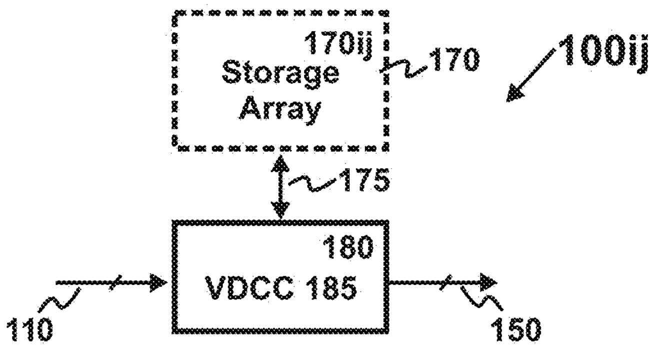
FIGS. 6A-6C are block diagrams of three preferred 3-D SPU's.
Figure 6B:
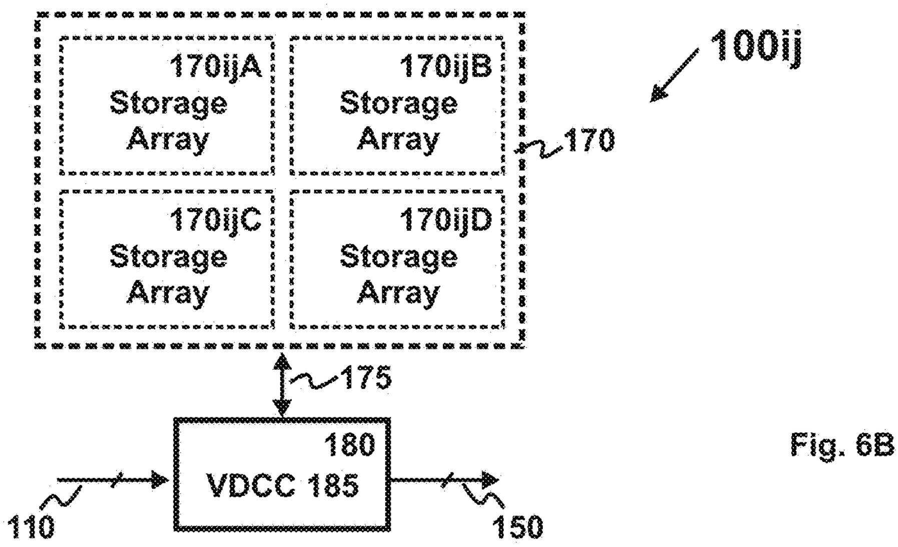
Figure 6C:
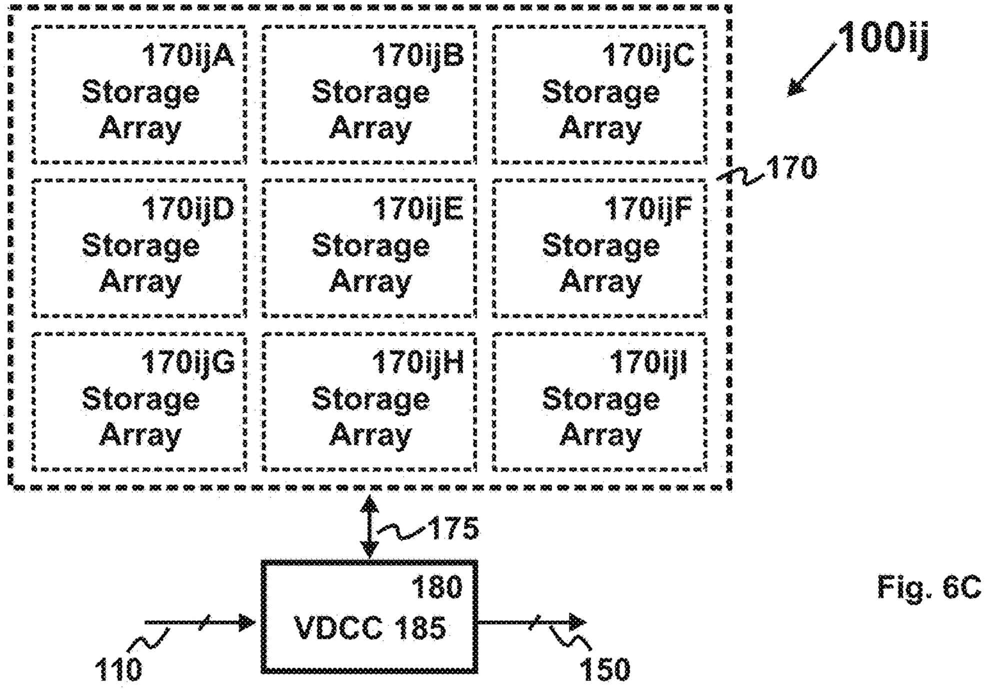

In FIG. 6A, the VDCC 185 serves a single storage array 170*ij*, i.e., it calculates vector distance for the data vectors stored in a single storage array 170*ij*. In FIG. 6B, the VDCC 185 serves four storage arrays 170*ij*A-170*ij*D, i.e., it calculates vector distance for the data vectors stored in four storage arrays 170*ij*A-170*ij*D. In FIG. 6C, the VDCC 185 serves nine storage arrays 170*ij*A-170*ij*I, i.e., it calculates vector distance for the data vectors stored in nine storage arrays 170*ij*A-170*ij*I. As will become apparent in FIGS. 7A-7C, the more storage arrays it serves, a larger area and more functionalities the VDCC 185 will have. In FIGS. 6A-7C, because they are located on a different plane than the VDCC 185 (referring to FIG. 3), the storage arrays 170*ij* are drawn in dashed lines.

Figure 7A:
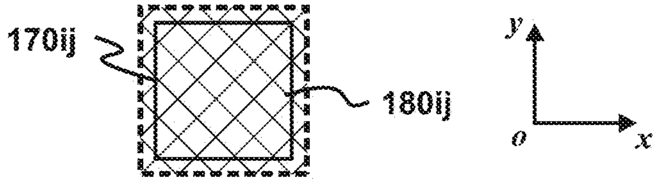
FIGS. 7A-7C are layout views of three preferred 3-D SPU's.
Figure 7B:
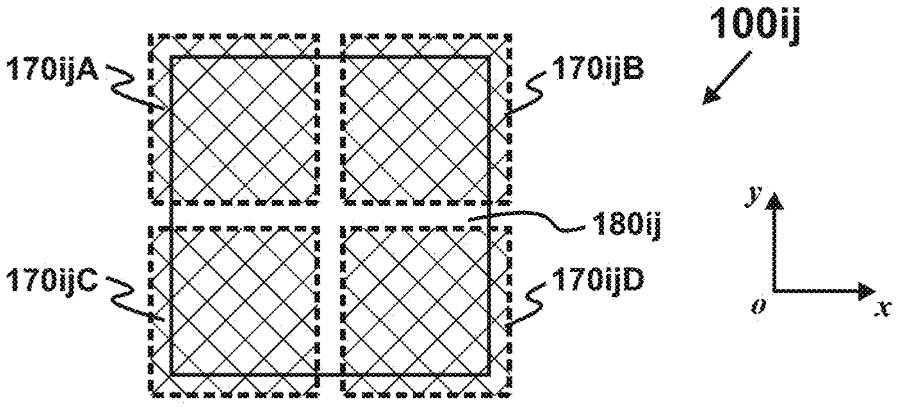
Figure 7C:
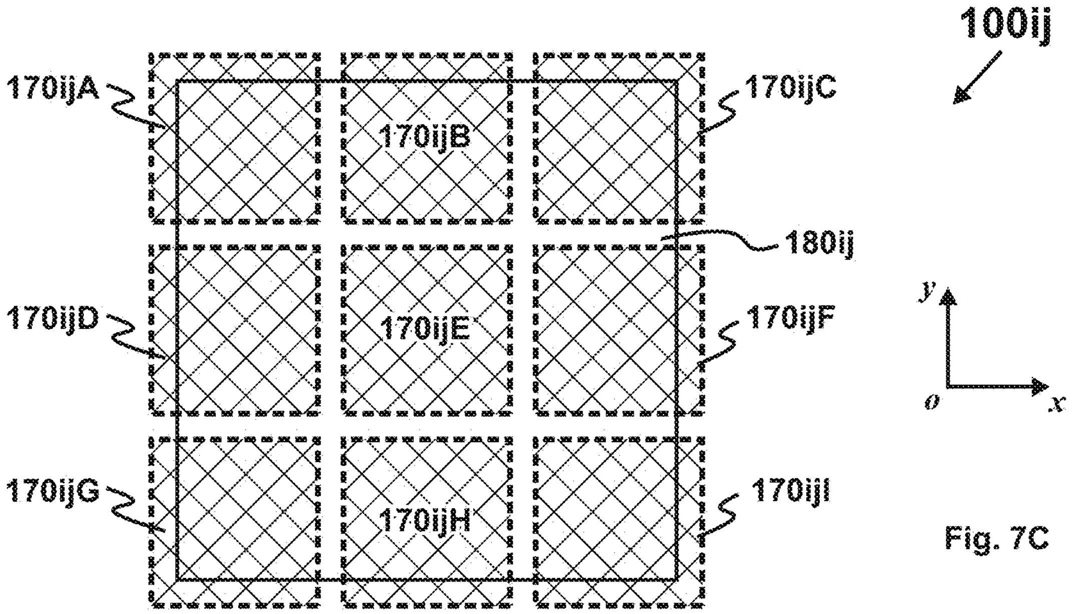

FIGS. 7A-7C illustrate the projections of the storage arrays 170 (physically located on the first plane 0L1, drawn in dashed lines) on the second plane 0L2 with respect to the VDCC 185. The preferred embodiment of FIG. 7A corresponds to that of FIG. 6A. Its VDCC 185 is covered by the storage array 170*ij*. In this preferred embodiment, the VDCC pitch is equal to that of the storage array. Because its area is smaller than the footprint of a storage array, the VDCC 185 in FIG. 7A has limited functionalities. It can be used to implement simple vector-distance calculating algorithms, as shown in FIG. 8A.

FIGS. 7B-7C discloses two complex VDCC's 185. These complex VDCC's can be used to implement complex vector-distance calculating algorithms, as shown in FIG. 8B and FIGS. 9-10. The preferred embodiment of FIG. 7B corresponds to that of FIG. 6B. Its VDCC 185 is covered by four storage arrays 170*ij*A-170*ij*D. Below the four storage arrays 170*ij*A-170*ij*D, the VDCC 185 can be laid out freely. Because the VDCC pitch is twice as much as that of the storage arrays, the VDCC 185 is four times larger than the footprint of each storage array and therefore, has more complex functionalities.

The preferred embodiment of FIG. 7C corresponds to that of FIG. 6C. Its VDCC 185 is covered by nine storage arrays (170*ij*A . . . 170*ij*I). Below the nine storage arrays (170*ij*A . . . 170*ij*I), the VDCC 185 can be laid out freely. Because the VDCC pitch is three times as much as that of the storage arrays, the VDCC 185 is nine times larger than the footprint of each storage array and therefore, has even more complex functionalities.

Figure 8A:
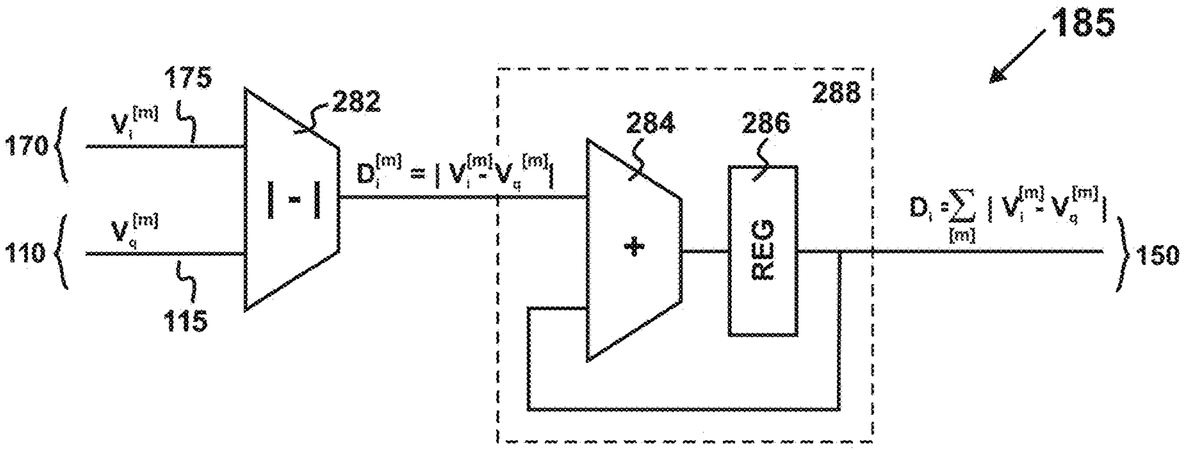
FIGS. 8A-8B are circuit diagrams of two preferred vector-distance calculation circuits (VDCC's).
Figure 8B:
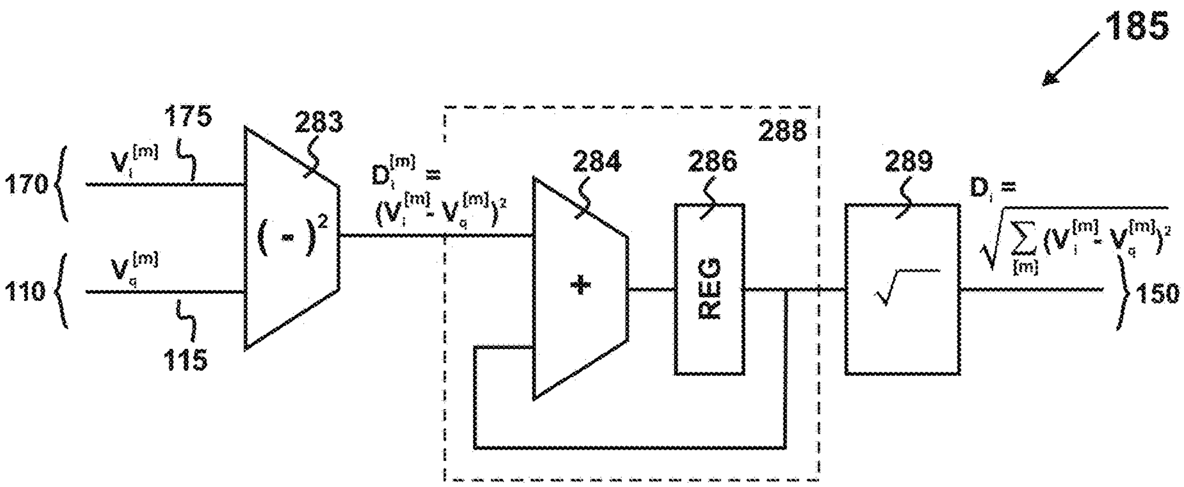
Figure 9:
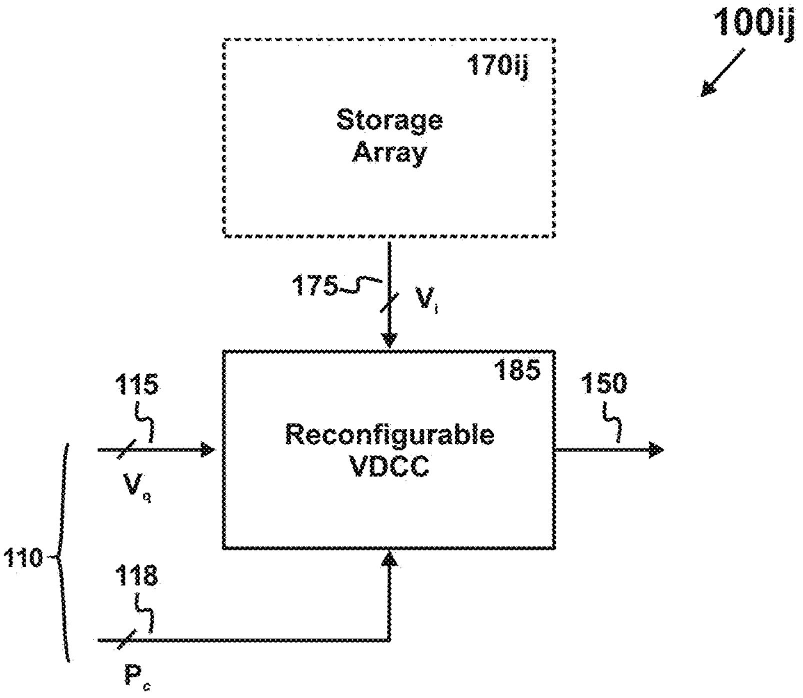
FIG. 9 is a block diagram of a preferred reconfigurable SPU.
Figure 10:
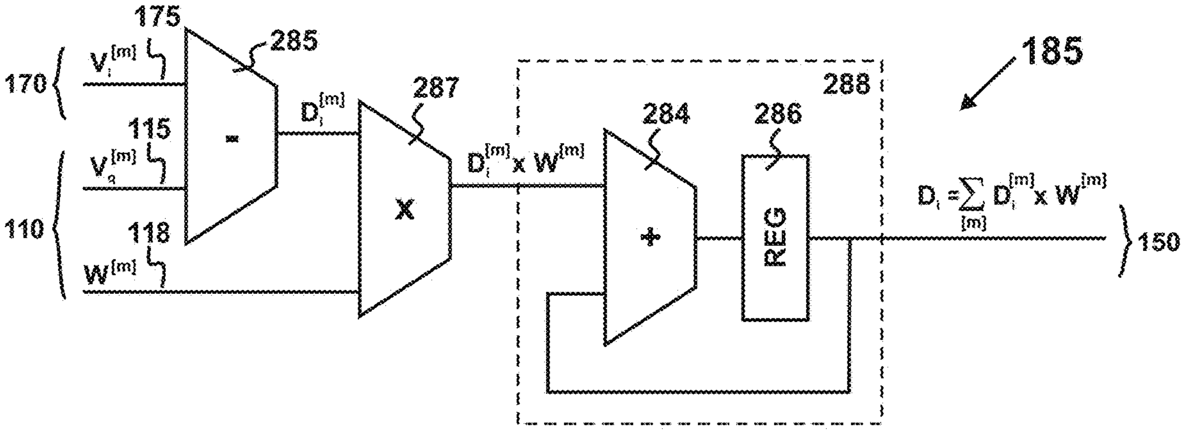
FIG. 10 is a circuit diagram of a preferred reconfigurable VDCC.

Referring now to FIGS. 8A-10, several preferred VDCC's 185 are disclosed. FIGS. 8A-8B discloses two preferred VDCC's 185 to implement Manhattan distance and Euclidean distance, respectively. The first preferred VDCC 185 of FIG. 8A calculates Manhattan distance. A sub-abs unit 282 calculates a difference $D_i^{[m]}=|V_i^{[m]}-V_q^{[m]}|$ (i.e., absolute value of subtraction), where $V_q^{[m]}$ is the value of the query vector $V_q$ 115 at the mth dimension (from the input 110); $V_i^{[m]}$ is the value of the data vector $V_i$ 175 at the mth dimension (from the storage circuit 170). Then an accumulator 288 (including an adder 284 and a register 286) sums the $D_i^{[m]}$ for all m dimensions. Performing only subtraction (with absolute value), this preferred VDCC 185 could be realized by a relatively simple circuit. For example, the VDCC 185 in FIG. 7A may be used.

The second preferred VDCC 185 of FIG. 8B calculates Euclidean distance. A sub-sqr unit 283 calculates a difference $D_i^{[m]}=(V_i^{[m]}-V_q^{[m]})^2$ (i.e., square of subtraction). Then an accumulator 288 sums the $D_i^{[m]}$ for all m dimensions, before a square-root operation 289 is performed. Because it involves square and square-root operations, the second preferred VDCC 185 could be realized by a relatively complex circuit. For example, the VDCC 185 in FIG. 7B may be used.

It is well known to those skilled in the art that, besides Manhattan distance and Euclidean distance, other vector-distance calculating algorithms can be used. They include Chebyshev distance, Minkowski distance, Cosine similarity, Haversine distance, Pearson correlation coefficient, Earth mover's distance (EMD), Jaccard similarity, Sorensen-Dice index, Hamming distance, inner product, and the like.

In general, different vector-distance calculating algorithm is preferred in different scenarios. To support dynamic metrics (i.e., use different distance-calculating algorithm in different scenarios), the present invention further discloses a reconfigurable vector database. As shown in FIG. 9, its SPU is reconfigurable SPU 100*ij* and its VDCC is a reconfigurable VDCC 185. The vector-distance calculating algorithm performed by the reconfigurable VDCC 185 is configured by the configuration parameters $P_c$ 118, which is also a part of the input 110. Like in FIG. 2A, the input 110 feeds into every reconfigurable SPU 100*ij* in an SPC 100. All reconfigurable SPU's in the SPC 100 are configured together to a different vector-distance calculating algorithm at the same time. For example, at time $t_1$, all reconfigurable SPU's are configured to a first vector-distance calculating algorithm; at time $t_2$, all reconfigurable SPU's are configured to a second vector-distance calculating algorithm; and so on.

FIG. 10 illustrates a preferred reconfigurable VDCC 185. It uses a weighted-distance algorithm. A subtractor 285 calculates a difference $D_i^{[m]}=V_q^{[m]}-V_i^{[m]}$. Then a multiplier 287 multiplies the difference $D_i^{[m]}$ with the weight $W^{[m]}$, which comes from the configuration parameters $P_c$ 118. The vector distance D is a weighted sum, i.e., the sum of $D_i^{[m]}*W^{[m]}$ for all m dimensions. By adjusting the weights $W^{[m]}$, different vector-distance calculating algorithms can be applied to each SPU 100*ij* in the SPC 100. This is particularly useful when optimizing the searching algorithm.

Figure 11:
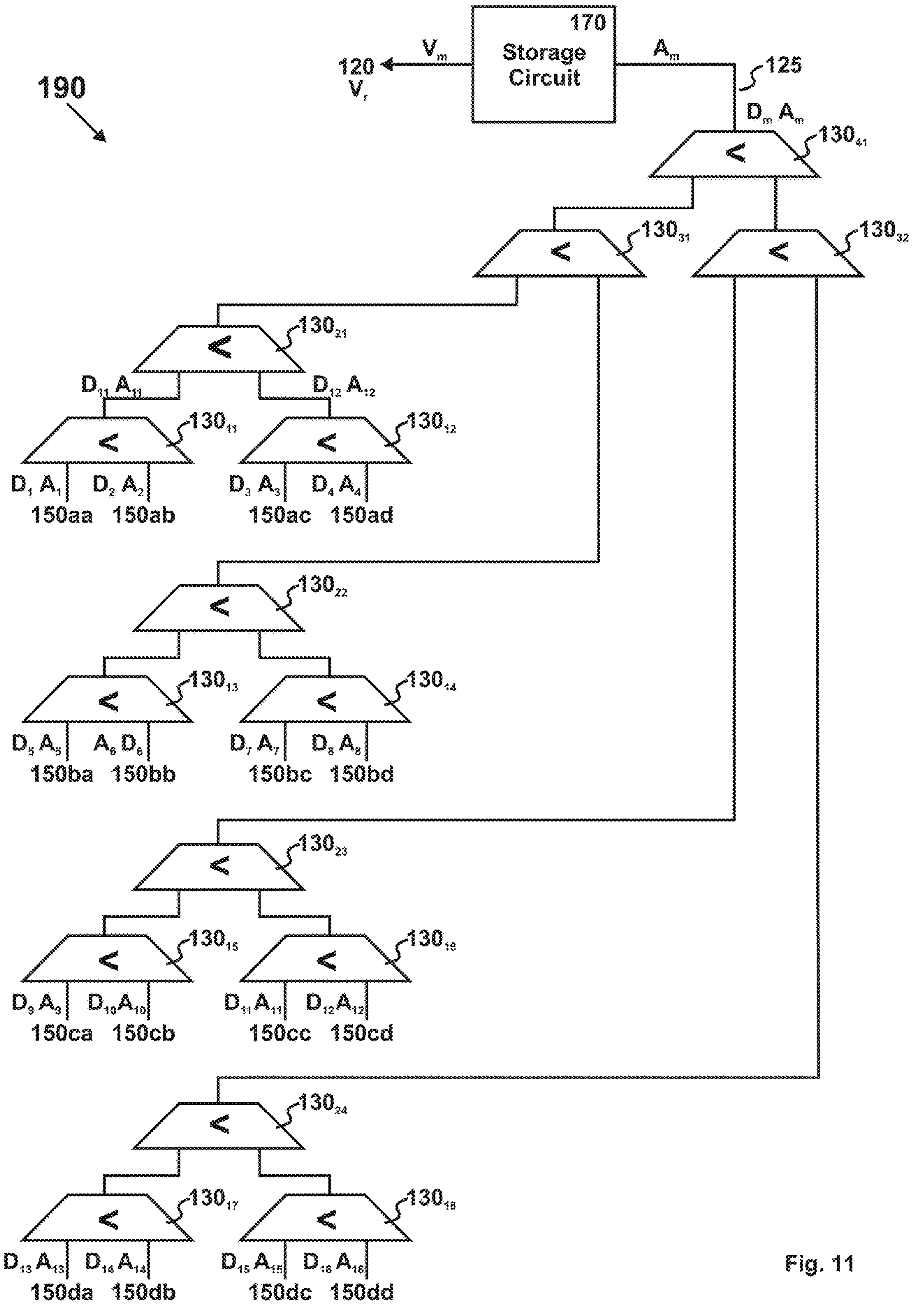
FIG. 11 is a circuit diagram of a preferred minimum-distance search circuit (MDSC).
Figure 12:
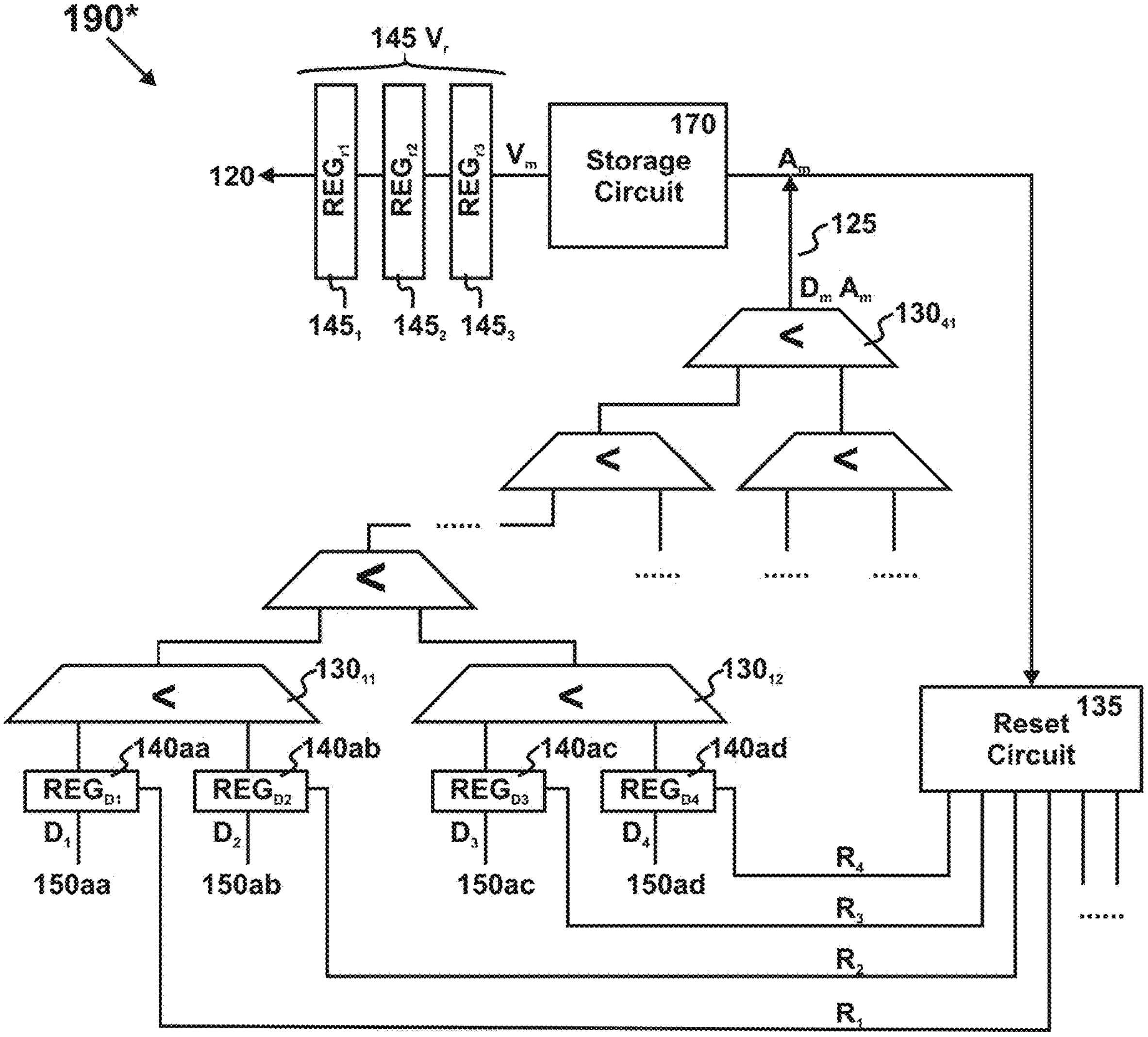
FIG. 12 is a circuit diagram of another preferred MDSC with a reset circuit.
Figure 13:
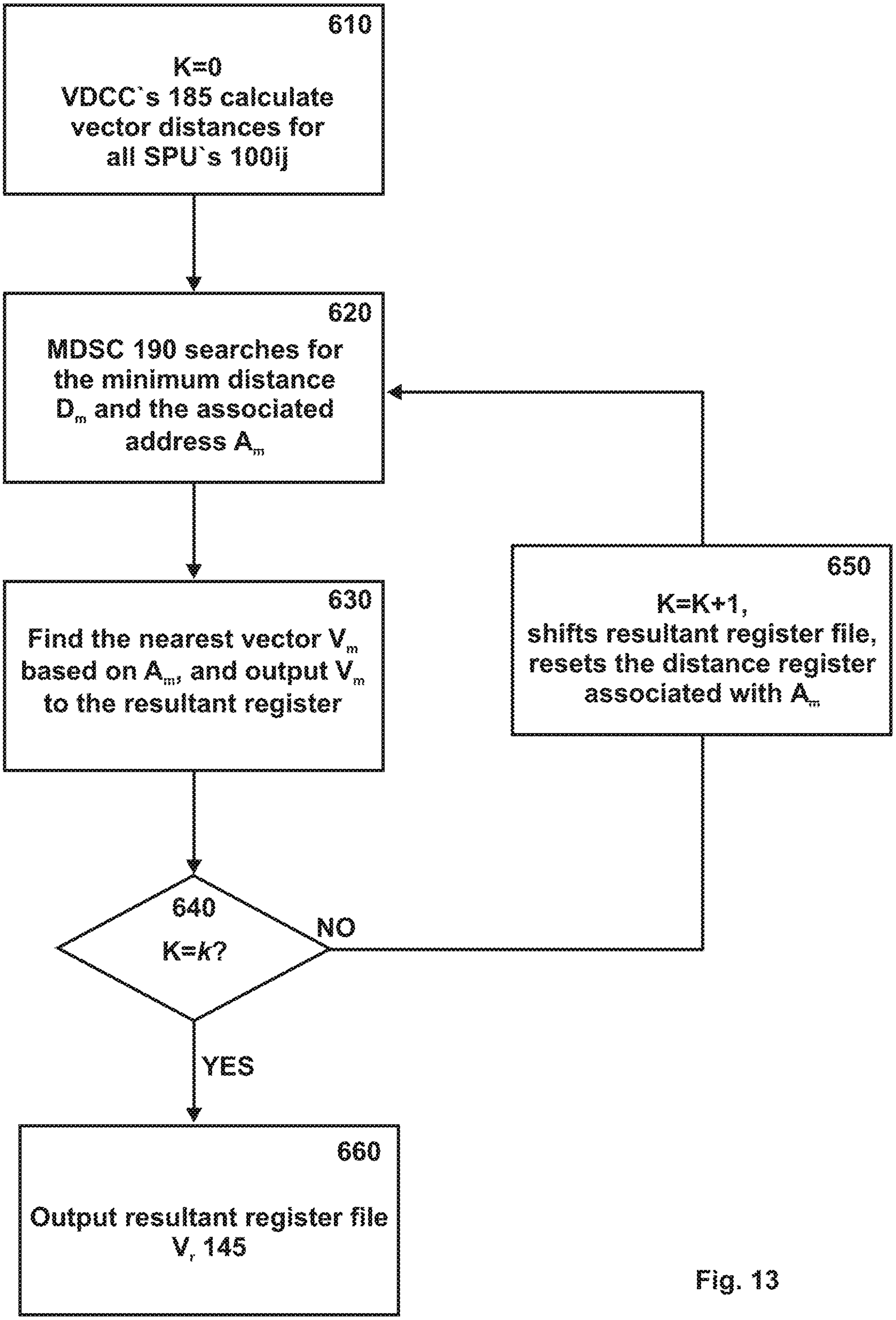
FIG. 13 is a flow diagram of a preferred minimum-distance searching algorithm.

Referring now to FIGS. 11-13, several preferred MDSC's 190 are disclosed. The first preferred MDSC 190 of FIG. 11 uses a binary-tree comparison circuit to find the minimum vector distance $D_m$. In this example, there are 16 SPU's, whose outputs 150*aa*-150*dd* are vector distances $D_1$-$D_{16}$. These vector distances $D_1$-$D_{16}$ are compared in pairs at first-stage comparators 13011-13018. Each comparator (e.g., 13011) has four inputs (e.g., $D_1$, $A_1$; $D_2$, $A_2$) and two outputs (e.g., $D_{11}$, $A_{11}$), where $D_1$ is the output from a first SPU and $A_1$ is the address of the first SPU; $D_2$ is the output from a second SPU and $A_2$ is the address of the second SPU; $D_{11}$ is the smaller of $D_1$ and $D_2$, while $A_{11}$ is the address associated with $D_{11}$. After comparing in pairs at the comparators 13011-13018, $D_{11}$-$D_{18}$ are sent to a second-stage comparators 13021-13024 to do another round of comparison. This process is repeated until reaching the last-stage comparator 13041, wherein the minimum vector distance $D_m$ and its associated minimum address $A_m$ are found. This minimum address $A_m$ is then sent to the storage circuit 170 to find the minimum-distance vector $V_m$, which is the nearest neighbor (i.e., the resultant vector $V_r$ 120) to the query vector $V_q$.

The example disclosed in FIG. 11 is a simplified case where the storage circuit 170 in each SPU 100*ij* stores a single data vector. In case that the storage circuit 170 stores X (X is a positive integer) data vectors, these data vectors are read out in X cycles during brute-force search. For example, within a first cycle, a first set of data vectors are read out from all SPU's and the MDSC 190 of FIG. 11 finds $D_{m1}$ for the first cycle (to be stored in a $D_{m1}$ register); within a second cycle, a second set of data vectors are read out from all SPU's and the MDSC 190 finds $D_{m2}$ for the second cycle (to be stored in a $D_{m2}$ register); and so on. After N cycles, $D_{m1}$, $D_{m2}$ . . . are compared to find $D_m$ for the whole vector database.

The present invention further supports top-k (k>1) nearest neighbors. The MDSC is suitable to find the minimum vector distance $D_m$ to a query vector $V_q$. To take full advantage of the MDSC, a reset circuit is used to reset the register storing $D_m$ to a pre-determined value (typically a maximum value, e.g., every bit is reset to "1") after $D_m$ is found. This effectively takes $D_m$ out of consideration for the next round of minimum-distance search. Thus, the minimum vector distance found at the next round is in fact the second minimum vector distance $D_{m-1}$. This process can be repeated to find all top-k nearest neighbors.

FIGS. 12-13 disclose a preferred MDSC 190* to find the top-k nearest neighbors and related methods. For this preferred MDSC 190* (FIG. 12), each VDCC output (e.g., 150*aa*, or, vector distance $D_1$) is stored in a vector-distance register (e.g., 140*aa*, or, $REG_{D1}$). This preferred MDSC 190* further comprises a reset circuit 135. Its input is the address $A_m$ associated with the minimum vector distance $D_m$, and its outputs $R_1$, $R_2$ . . . are respectively connected with the reset port of the vector-distance registers $REG_{D1}$ 140*aa*, $REG_{D2}$ 140*ab*q. After finding $A_m$ and outputting $V_m$, the reset circuit 135 resets the vector-distance register associated with the address $A_m$ to a pre-determined value (typically the maximum vector distance, e.g., every bit of this vector-distance register is reset to "1").

The searching loop for $V_m$ (FIG. 13) is same as that in FIG. 11: VDCC's 185 calculate vector distances D for all SPU's (step 610); MDSC 190 searches for the minimum vector distance $D_m$ and the associated address $A_m$ (step 620); from $A_m$, find $V_m$ in the storage circuit 170 (step 630). Once $V_m$ is found, the next step is to find $V_{m-1}$ (steps 640-650). A key step is to reset the vector-distance register associated with $A_m$ to a pre-determined value (e.g., all "1"s). For example, $D_2$ is the minimum vector distance and $A_m$ points to 150*ab*. The reset circuit 135, which is a decoder that uses $A_m$ as inputs, sets the signals on wire $R_2$ to high. This will reset the vector-distance register $REG_{D2}$ 140*ab* (step 650).

As $V_m$ is taken out of consideration, a second searching loop (steps 620-630) will result in $V_{m-1}$. After $V_{m-1}$ is taken out of consideration, a third searching loop (steps 620-630) will result in $V_{m-2}$. Continue the searching loops until the top-k nearest neighbors are found (step 660).

Figure 14:
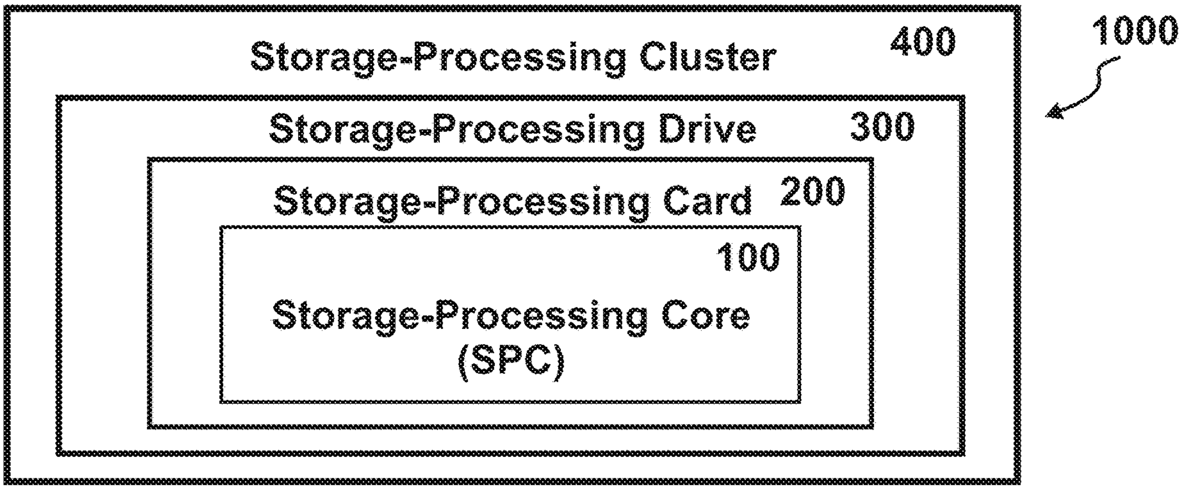
FIG. 14 is a preferred storage-processing hierarchy.
Figure 15:
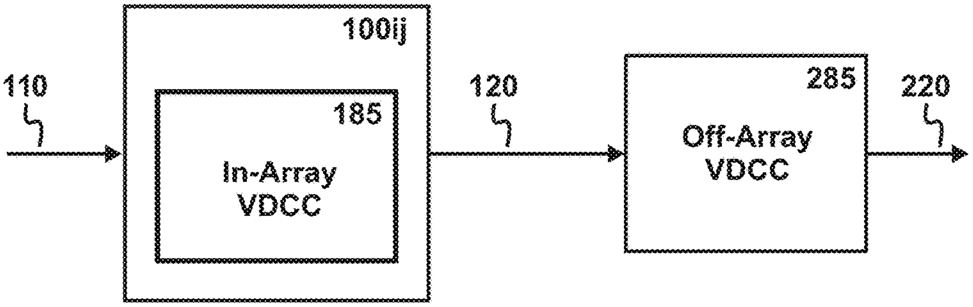
FIG. 15 is a block diagram of a preferred hybrid VDCC.

Referring now to FIGS. 14-16D, a preferred storage-processing hierarchy 1000 and the associated hybrid VDCC's are disclosed. As shown in FIG. 14, the SPC's 100 can be packaged into storage-processing cards 200; the storage-processing cards 200 can be packaged into storage-processing drives 300; and, the storage-processing drives 300 can be packaged into storage-processing clusters 400. They form a storage-processing hierarchy 1000. Each level of the storage-processing hierarchy has its own vector-computing circuit, e.g., VDCC, filtering circuit, and sorting circuit. The computing circuit at a lower level is generally less complex than the one at a higher level. Moreover, the selection criterion at a lower level is more lenient. Accordingly, the present invention discloses hybrid VDCC's. As is shown in FIG. 15, the preferred hybrid VDCC's comprises an in-array VDCC 185 and an off-array VDCC 285. The in-array VDCC 185 is disposed in/under the storage arrays, while the off-array VDCC 285 is disposed outside the storage arrays.

Figure 16A:
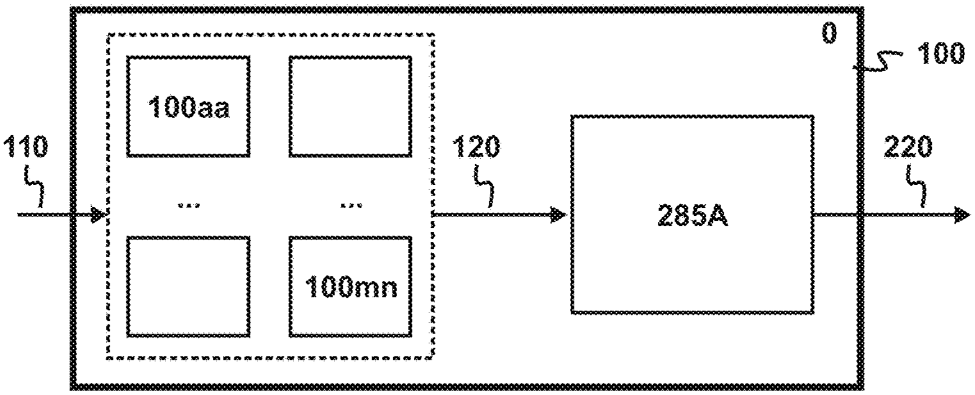
FIGS. 16A-16D are block diagrams of four preferred hybrid VDCC's.
Figure 16B:
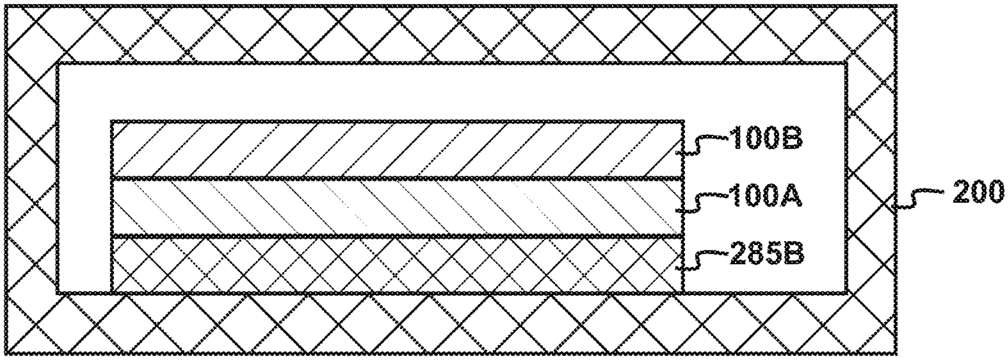
Figure 16C:
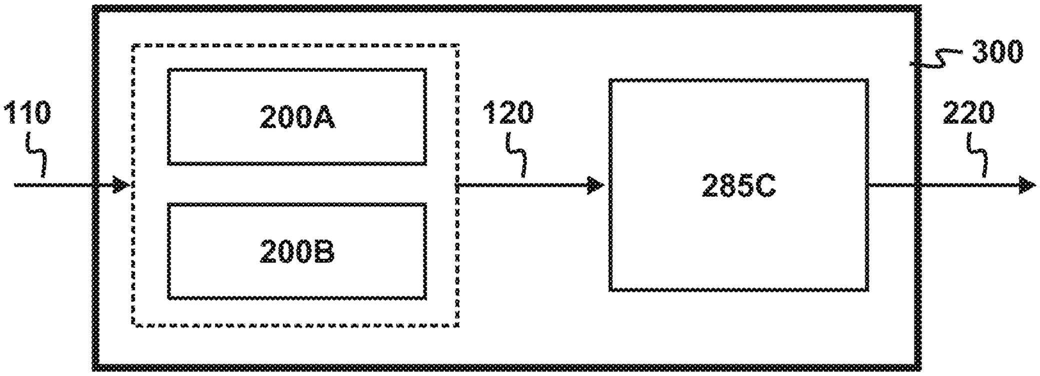
Figure 16D:
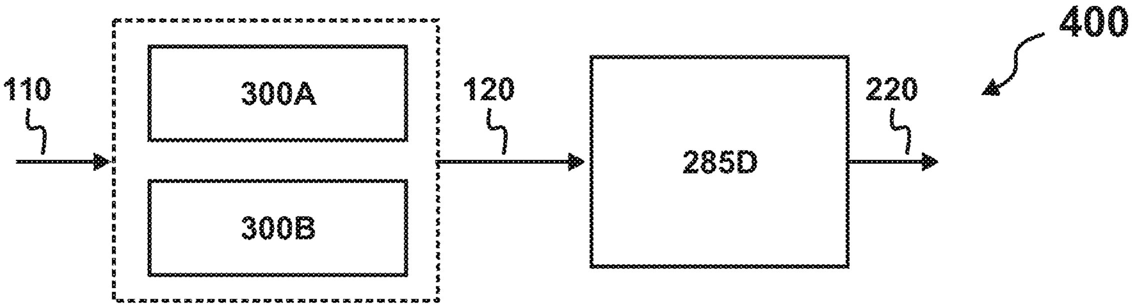

FIGS. 16A-16D give a few examples of the preferred storage-processing bodies. They can all use the hybrid VDCC of FIG. 15. In the embodiment of FIG. 16A, the off-array VDCC 285A is located on the same semiconductor substrate 0 with the in-array VDCC 185, but it is located outside all SPU's 100*aa*-100*mn*. It serves all SPU's 100*aa*-100*mn* within the same SPC 100. In the embodiment of FIG. 16B, the off-array VDCC 285B are disposed on a different die than the SPC's 100A, 100B. They overlap each other and are packaged into a storage-processing card 200. The off-array VDCC 285B serves the SPC's 100A, 100A. In the embodiment of FIG. 16C, the off-array VDCC 285C and the storage-processing cards 200A, 200B are packaged into a storage-processing drive 300. It serves the storage-processing cards 200A, 200B. In the embodiment of FIG. 16D, the off-array VDCC 285D serves the storage-processing drives 300A, 300B.

In the storage-processing hierarchy 1000 (FIGS. 16A-16D), the computing circuit at a higher level is generally more complex than the one at a lower level. Moreover, the selection criterion at a higher level is more strict. For example, at the SPC level (FIG. 16A), the in-array VDCC 185 uses a simple vector-distance calculating algorithm, e.g., Manhattan distance (uses subtraction, no multiplication); the off-array VDCC 285A uses a complex vector-distance calculating algorithm, e.g., Euclidean distance (uses square and square root). At the storage-processing card level (FIG. 16B), the VDCC 285B uses a more complex vector-distance calculating algorithm, e.g., Standardized Euclidean distance (uses square, division and square root). At the storage-processing drive level (FIG. 16C) and the storage-processing cluster level (FIG. 16D), the VDCC's 285C,285D may use an even more complex vector-distance calculating algorithm, e.g., cosine similarity (uses square, division and square root). Furthermore, the VDCC at selected level(s) can be reconfigurable VDCC. Because data are filtered at various levels, less and less data are sent from a lower level to a higher level. This can significantly lower the bandwidth requirements and improve performance.

One great advantage of the present invention is that its brute-force search time is roughly independent of scale Z of the vector database. Brute-force search includes the following three actions: vector reading, vector-distance calculation, and minimum-distance search. Due to parallel execution of vector reading and vector-distance calculation in all SPU's, the total brute-force search time includes: the data-reading time ($t_{wa}$) of all vectors in an SPU, the vector-distance calculation time ($t_{vd}$) of all vectors in an SPU, and the search time for the minimum vector distance among all vector distances in the entire vector database ($T_{ms}$). Among them, $t_{wa}$ and $t_{vd}$ are independent of Z, but only proportional to the storage capacity z of an SPU; only $T_{ms}$ is related to Z, but its relationship $T_{ms} \propto \log_2(Z)$ (see FIG. 11) is much weaker than the proportional relationship in prior art. Taking 3D-XPoint as an example, $t_{wa}+t_{vd}$~10 ms; for a large-scale vector database, if $Z=10^{12}$, then $T_{ms}$~20 us; if $Z=10^{15}$, then $T_{ms}$~30 us. Apparently, $Tn \ll t_{wa}+t_{vd}$. Hence, the brute-force search time of the present invention is roughly independent of Z: no matter whether Z is trillion ($10^{12}$), quadrillion ($10^{15}$), or even higher, the search time is about the same (e.g., ~10 ms). Compared with prior art where search time increases with Z, the consistency of the search time in the present invention can greatly simplify system design. On the other hand, to save energy, the brute-force search does not need to be performed in the entire vector database. It only needs to be performed in a selected portion of the vector database.

Finally, impact of the present invention will be discussed. Modeling plays a key role in AI. In the large-language model (LLM), the computing cost for modeling (C) is proportional to the product of the parameter size (P) and the data size (D) (i.e., $C \approx 6PD$). Since P is roughly proportional to D, the computing cost for modeling is proportional to the square of data size (i.e., $C \propto D^2$). This leads to a dire consequence for "AI scaling."

"AI scaling" scales data the LLM handles. It is anticipated that the data size will grow by one thousand times (1,000×). Based on the above square relationship ($C \propto D^2$), the modeling cost (including chip cost and energy cost) will increase by one million times (1,000,000×). This sharp increase in demands for chips and energy cannot be supported by resources on earth. Hence, the modeling-based AI is not sustainable.

In fact, modeling/fitting is not the only method for numerical analysis. The two basic tools for numerical analysis are fitting and interpolation. Interpolation estimates the value of an unknown point from its neighbors. It can achieve the same result as fitting. Fitting has less requirement on storage (provided that its parameters size is much smaller than the data size), but requires a separate modeling (parameter extraction) step and therefore, a large computational power; interpolation does not require a separate modeling step and therefore has little requirement on the computational power, but requires a large storage space and associated search capability.

In the past, modeling/fitting is the main stream. As the computational power is relatively abundant, modeling is the preferred method for AI. When the computational power is no longer adequate due to AI scaling, interpolation starts to gain tractions. Vector database and retrieval-augmented generation (RAG) are typical examples of interpolation. The top-k nearest-neighbor search is the exact method used by interpolation. However, the prior-art vector database, although making improvements on the software side, is still built on the conventional hardware. This limits its accuracy, speed, dimensions, and scale. As a result, the prior-art vector database is limited to small-scale knowledge bases. The present invention, empowering accurate and fast search for large-scale and high-dimensional vector database, broadens the applications of vector database to general human knowledge (world knowledge base). More importantly, its cost (storage cost and computing cost) are proportional to data size ($C \propto D^1$). Compared with prior art where computing cost is proportional to the square of the data size ($C \propto D^2$), the present invention is much more sustainable. Hence, "computational power" is not the only approach to world knowledge base, "storage power" (not just storage, but storage with accurate and fast searching capability) is also a viable approach The present invention can also be applied to scientific computing and engineering instrumentation. For example, in metrology, it is often necessary to compare the measured vector with a library of pre-computed vectors to find the nearest pre-computed vector and use that to determine the initial guess for the parameters to be measured. The brute-force search disclosed in the present invention can directly find the global minimum, thereby avoiding being stuck in a local minimum and reducing the computational power required for regression calculations.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

The invention claimed is:

1. A fused vector database, comprising an input for inputting a query vector and at least a storage-processing core (SPC) coupled with said input, wherein said SPC comprises:

a plurality of storage-processing units (SPU's), each SPU of said plurality of SPU's comprising a vector-distance calculation circuit (VDCC) and at least one storage array, wherein said VDCC calculates a vector distance between said query vector and a data vector stored in said at least one storage array;

a minimum-distance search circuit (MDSC) communicatively coupled with said plurality of SPU's, wherein said MDSC receives vector distances calculated by the VDCC's at said plurality of SPU's and searches for at least a minimum vector distance from said vector distances;

wherein the storage arrays of said plurality of SPU's are disposed on a first plane; said MDSC and the VDCC's of said plurality of SPU's are disposed on a second plane; said first and second planes are vertically stacked and communicatively coupled by inter-plane connections.

2. The fused vector database according to claim 1, wherein, within said each SPU, said VDCC and said at least one storage array are communicatively coupled by selected ones of said inter-plane connections.

3. The fused vector database according to claim 2, wherein, within said each SPU, said VDCC and the projection of said at least one storage array on said second plane at least partially overlap.

4. The fused vector database according to claim 2, wherein said SPC is a mechanically-stable entity.

5. The fused vector database according to claim 2, wherein said SPC is a storage-processing die.

6. The fused vector database according to claim 5, wherein said storage-processing die comprises a semiconductor substrate;

said MDSC and the VDCC's of said plurality of SPU's are disposed on said semiconductor substrate;

the storage arrays of said plurality of SPU's are disposed above said semiconductor substrate.

7. The fused vector database according to claim 2, wherein said SPC is a storage-processing stack.

8. The fused vector database according to claim 7, wherein:

said MDSC and the VDCC's of said plurality of SPU's are disposed on a first die;

the storage arrays of said plurality of SPU's are disposed on a second die;

wherein said first and second dice are bonded.

9. The fused vector database according to claim 8, wherein said first and second dice are bonded face-to-back.

10. The fused vector database according to claim 8, wherein said first and second dice are bonded face-to-face.

11. The fused vector database according to claim 8, wherein said first and second dice are bonded by hybrid bonding.

12. The fused vector database according to claim 8, wherein said first and second dice have a same die size.

13. The fused vector database according to claim 8, wherein all edges of said first and second dice align.

14. The fused vector database according to claim 1, wherein said vector distance is a Manhattan distance, an Euclidean distance, Chebyshev distance, Minkowski distance, Cosine similarity, Haversine distance, Pearson correlation coefficient, Earth mover's distance (EMD), Jaccard similarity, Sorensen-Dice index, Hamming distance, or inner product.

15. The fused vector database according to claim 1, wherein said VDCC's at said plurality of SPU's are configured to implement a same vector-distance calculating algorithm.

16. The fused vector database according to claim 1, wherein said VDCC is a reconfigurable VDCC configured to implement a first vector-distance calculating algorithm at a first time and a second vector-distance calculating algorithm at a second time.

17. The fused vector database according to claim 1, further comprising an off-array VDCC disposed outside said plurality of SPU's.

18. The fused vector database according to claim 17, wherein said off-array VDCC implements a different vector-distance calculating algorithm than said VDCC at said each SPU.

19. The fused vector database according to claim 1, wherein said MDSC is a binary-tree comparison circuit.

20. The fused vector database according to claim 1, wherein said MDSC searches for at least a second minimum vector distance larger than said minimum vector distance.

21. The fused vector database according to claim 1, wherein:

said VDCC's are parallel circuits configured to compute at said plurality of SPU's in parallel; and said MDSC is a sequential circuit comprising a plurality of stages configured to compute at said plurality of stages in sequence.

22. The fused vector database according to claim 21, wherein a first number of said plurality of SPU's is larger than a second number of said plurality of stages.

23. The fused vector database according to claim 1, wherein said at least one storage array belongs to random-access memory (RAM), read-only memory (ROM), non-volatile memory (NVM), or three-dimensional memory (3D-M).

24. The fused vector database according to claim 1, wherein said SPU is a reconfigurable SPU.

25. The fused vector database according to claim 1, wherein said VDCC is a reconfigurable VDCC for performing a weighted sum.

26. The fused vector database according to claim 1, further comprising:

a plurality of vector-distance registers for storing the vector distances calculated by the VDCC's in said plurality of SPU's;

a reset circuit for resetting the vector-distance register associated with said minimum vector distance to a pre-determined value after said minimum vector distance is found.

* * * * *